United States Patent
Bennett et al.

(10) Patent No.: US 10,719,802 B2
(45) Date of Patent: Jul. 21, 2020

(54) ENFORCEMENT OF SHIPPING RULES

(71) Applicant: United Parcel Service of America, Inc., Atlanta, GA (US)

(72) Inventors: David Allison Bennett, Bothell, WA (US); Lynn Shaindell Goldhaber, Bellevue, WA (US); Christopher Michael Monsos, Seattle, WA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 1129 days.

(21) Appl. No.: 14/931,374

(22) Filed: Nov. 3, 2015

(65) Prior Publication Data

US 2016/0275448 A1    Sep. 22, 2016

Related U.S. Application Data

(60) Provisional application No. 62/135,491, filed on Mar. 19, 2015, provisional application No. 62/135,496, filed on Mar. 19, 2015.

(51) Int. Cl.
*G06Q 10/08* (2012.01)
*G06F 16/22* (2019.01)
(Continued)

(52) U.S. Cl.
CPC ..... *G06Q 10/0832* (2013.01); *G06F 16/2246* (2019.01); *G06Q 10/083* (2013.01); *G06Q 30/018* (2013.01); *G06Q 50/30* (2013.01)

(58) Field of Classification Search
CPC ............. G06Q 10/0832; G06Q 10/083; G06Q 30/018; G06Q 50/30; G06F 16/2246
See application file for complete search history.

(56) References Cited

U.S. PATENT DOCUMENTS 5,726,884 A * 3/1998 Sturgeon ............ G06Q 10/0631
 705/7.12
5,924,094 A * 7/1999 Sutter ................ G06F 17/30575
(Continued)

OTHER PUBLICATIONS

Yutaka Ohsawa, "A new Tree Type Data Structure With Homogeneous Nodes Suitable for a Very Large Spatial Database", published by University of Tokyo in 1990 (Year: 1990).*
(Continued)

*Primary Examiner* — Kevin H Flynn
*Assistant Examiner* — Omar Zeroual
(74) *Attorney, Agent, or Firm* — Shook, Hardy and Bacon LLP

(57) ABSTRACT

Methods, systems, and apparatus, including computer programs encoded on a computer storage medium, for a user interface for enforcement of shipping rules. In one aspect, a method includes accessing regulation information/data, the regulation information/data being a multi-level hierarchy of nodes arranged in a tree structure, each node specifying one or more keywords, wherein the nodes comprise one or more starting nodes having one or more child nodes and having no parent nodes, one or more intermediate nodes having at least one of a child node and a parent node, and one or more end nodes having at least one parent node and no child nodes. Determining, that a particular keyword from the received one or more keywords matches a keyword of a node in the hierarchy. Determining, a level and a type of the node in the hierarchy, wherein the type of the node specifies whether the node is one of a starting node, an intermediate node, and an end node. The method then identifies, based, at least in part, on the level and the type of the node in the hierarchy, one or more actions to be performed.

33 Claims, 15 Drawing Sheets

(51) Int. Cl.
  *G06Q 50/30* (2012.01)
  *G06Q 30/00* (2012.01)

(56) References Cited

U.S. PATENT DOCUMENTS

| | | | | |
|---|---|---|---|---|
| 6,128,617 | A * | 10/2000 | Lowry | G06F 16/242 |
| 6,163,732 | A * | 12/2000 | Petke | G06Q 99/00 |
| | | | | 700/106 |
| 6,341,287 | B1 * | 1/2002 | Sziklai | G06Q 10/06 |
| 6,397,115 | B1 * | 5/2002 | Basden | G05B 15/02 |
| | | | | 700/266 |
| 6,463,419 | B1 * | 10/2002 | Kluss | G06Q 10/08 |
| | | | | 705/330 |
| 6,879,962 | B1 | 4/2005 | Smith et al. | |
| 7,412,444 | B2 * | 8/2008 | Gaponoff | G06F 17/30327 |
| 7,512,594 | B2 * | 3/2009 | Zhang | G06F 16/248 |
| 7,542,991 | B2 * | 6/2009 | Ouzounian | G16H 50/80 |
| 7,606,762 | B1 * | 10/2009 | Heit | G06Q 20/042 |
| | | | | 705/39 |
| 7,676,389 | B2 * | 3/2010 | Jackson | G06Q 10/0631 |
| | | | | 705/7.12 |
| 8,065,237 | B2 * | 11/2011 | Bennett | G06Q 10/08 |
| | | | | 705/330 |
| 8,224,758 | B2 * | 7/2012 | Humprecht | G06Q 10/08 |
| | | | | 700/106 |
| 8,255,411 | B1 * | 8/2012 | Carpenter | G06F 3/0482 |
| | | | | 707/764 |
| 8,429,422 | B1 * | 4/2013 | Hagan | H04L 67/02 |
| | | | | 713/190 |
| 8,495,068 | B1 * | 7/2013 | Awalt | G06Q 30/06 |
| | | | | 707/740 |
| 8,671,120 | B1 * | 3/2014 | Bicknell | G06Q 10/08 |
| | | | | 707/804 |
| 8,725,656 | B1 * | 5/2014 | Gill | G06Q 10/101 |
| | | | | 705/331 |
| 8,738,414 | B1 * | 5/2014 | Nagar | G06Q 10/103 |
| | | | | 705/7.12 |
| 9,116,890 | B2 * | 8/2015 | King | G06F 16/435 |
| 9,195,939 | B1 * | 11/2015 | Goyal | G06F 16/2246 |
| 9,452,854 | B1 * | 9/2016 | Godfrey | G06Q 10/0875 |
| 9,563,874 | B1 * | 2/2017 | McPhie | G06Q 10/10 |
| 2002/0010665 | A1 * | 1/2002 | Lefebvre | G06Q 30/06 |
| | | | | 705/31 |
| 2002/0023057 | A1 * | 2/2002 | Goodwin | G06Q 30/02 |
| | | | | 705/50 |
| 2002/0091574 | A1 * | 7/2002 | Lefebvre | G06Q 20/207 |
| | | | | 705/19 |
| 2002/0129017 | A1 * | 9/2002 | Kil | G06F 17/30539 |
| 2003/0105704 | A1 * | 6/2003 | Sundel | G06Q 10/0831 |
| | | | | 705/37 |
| 2003/0115289 | A1 * | 6/2003 | Chinn | G06F 17/30067 |
| | | | | 709/219 |
| 2003/0163447 | A1 * | 8/2003 | Sandman | G06Q 10/10 |
| 2003/0171962 | A1 * | 9/2003 | Hirth | G06Q 10/06315 |
| | | | | 705/7.25 |
| 2004/0015487 | A1 * | 1/2004 | Lin | G06F 17/30448 |
| 2004/0015488 | A1 * | 1/2004 | Anonsen | G06F 17/30595 |
| 2004/0030490 | A1 * | 2/2004 | Hegedus | G01C 21/343 |
| | | | | 701/532 |
| 2005/0004894 | A1 * | 1/2005 | Uy | G06Q 10/063 |
| 2005/0131843 | A1 * | 6/2005 | Sansone | G07B 17/00024 |
| | | | | 705/410 |
| 2005/0289168 | A1 * | 12/2005 | Green | G06F 16/951 |
| 2006/0015469 | A1 * | 1/2006 | Whitehouse | G06Q 10/0831 |
| | | | | 705/410 |
| 2006/0036407 | A1 * | 2/2006 | Smith | G06Q 10/087 |
| | | | | 702/188 |
| 2006/0036504 | A1 * | 2/2006 | Allocca | G06Q 30/06 |
| | | | | 705/26.1 |
| 2006/0106856 | A1 * | 5/2006 | Bermender | G06F 17/30563 |
| 2006/0136309 | A1 * | 6/2006 | Horn | G06Q 10/087 |
| | | | | 705/26.8 |
| 2006/0156262 | A1 * | 7/2006 | Abe | G01R 31/31831 |
| | | | | 716/103 |
| 2006/0224613 | A1 * | 10/2006 | Bermender | G06Q 10/06 |
| 2007/0073734 | A1 * | 3/2007 | Doan | G06F 16/83 |
| 2007/0234202 | A1 * | 10/2007 | Lyness | G06F 3/0482 |
| | | | | 715/234 |
| 2008/0097933 | A1 * | 4/2008 | Awaida | G06Q 10/10 |
| | | | | 705/400 |
| 2008/0162305 | A1 * | 7/2008 | Rousso | G06Q 10/0631 |
| | | | | 705/26.5 |
| 2008/0228712 | A1 * | 9/2008 | Nomura | G01C 21/32 |
| 2008/0294536 | A1 * | 11/2008 | Taylor | G06Q 20/203 |
| | | | | 705/28 |
| 2009/0094542 | A1 * | 4/2009 | McKelvey | G06Q 10/00 |
| | | | | 715/765 |
| 2009/0138379 | A1 * | 5/2009 | Scheman | G06Q 30/06 |
| | | | | 705/26.1 |
| 2009/0282062 | A1 * | 11/2009 | Husic | G06F 21/62 |
| 2010/0023422 | A1 * | 1/2010 | Thompson | G06Q 30/0284 |
| | | | | 705/26.1 |
| 2010/0153848 | A1 * | 6/2010 | Saha | G06F 17/30884 |
| | | | | 715/721 |
| 2011/0060747 | A1 * | 3/2011 | Rose | G06F 16/313 |
| | | | | 707/750 |
| 2011/0066549 | A1 * | 3/2011 | Whitehouse | G06Q 10/0831 |
| | | | | 705/39 |
| 2012/0066153 | A1 * | 3/2012 | Whitehouse | G07B 17/00193 |
| | | | | 705/407 |
| 2012/0078805 | A1 * | 3/2012 | Monz-Schneider | |
| | | | | G06Q 10/0831 |
| | | | | 705/331 |
| 2012/0089631 | A1 * | 4/2012 | Poon | G06F 17/30589 |
| | | | | 707/769 |
| 2012/0130927 | A1 * | 5/2012 | Shimogori | G06N 20/00 |
| | | | | 706/12 |
| 2013/0060658 | A1 * | 3/2013 | Quan | G06O 30/06 |
| | | | | 705/26.25 |
| 2013/0275466 | A1 * | 10/2013 | Xiao | G06F 16/90335 |
| | | | | 707/769 |
| 2013/0323476 | A1 * | 12/2013 | Farrell | B29C 65/1609 |
| | | | | 428/195.1 |
| 2014/0122368 | A1 * | 5/2014 | Gittleman | G06Q 10/0832 |
| | | | | 705/332 |
| 2014/0156298 | A1 * | 6/2014 | Crawford | G16H 10/60 |
| | | | | 705/2 |
| 2014/0280363 | A1 * | 9/2014 | Heng | G06F 17/30289 |
| | | | | 707/802 |
| 2014/0379603 | A1 * | 12/2014 | Bodenhamer | G06Q 10/083 |
| | | | | 705/330 |
| 2015/0019454 | A1 * | 1/2015 | Helseth | G06Q 10/0831 |
| | | | | 705/331 |
| 2015/0186447 | A1 * | 7/2015 | Milousheff | G06F 17/30289 |
| | | | | 707/694 |
| 2015/0347390 | A1 * | 12/2015 | Tewari | G06F 40/289 |
| | | | | 704/9 |
| 2016/0078038 | A1 * | 3/2016 | Solanki | G06F 16/345 |
| | | | | 707/727 |
| 2016/0092487 | A1 * | 3/2016 | Upadhyaya | G06F 17/30371 |
| | | | | 707/694 |
| 2016/0275447 | A1 * | 9/2016 | Bennett | G06Q 10/0832 |
| 2016/0275448 | A1 * | 9/2016 | Bennett | G06Q 10/0832 |
| 2016/0283526 | A1 * | 9/2016 | Shmueli | G06F 17/30297 |

OTHER PUBLICATIONS

Canadian Intellectual Property Office, Requisition by the Examiner for Application No. 2,923,539, Feb. 28, 2017, 6 pages, Canada.

Temple, James. "High-Speed Pursuits; Google Wants Internet to be Instantaneous, Which Would Attract More Users—Not to Mention Money." San Francisco Chronicle: D1. Oct. 3, 2010. Proquest. Web. Nov. 3, 2016.

International Preliminary Examining Authority, International Preliminary Report on Patentability, Including Applicant's Jan. 18, 2017 Response to the ISA's First Written Opinion, for International Application No. PCT/US2016/013369, May 23, 2017, European Patent Office, Germany, 25 pages.

(56) References Cited

OTHER PUBLICATIONS

CSX Corporation, "ShipCSX eBusiness", Oct. 19, 2006-Dec. 25, 2010, Internet Archive <https://shipcsx.com/public/shipcsx/WebHelp/si-csxi/SI_CSXI_HazMat_Details.htm>, 5 pages.

Fedex, "FedEx Ship Manager Software Help Guide", Jan. 2011, retrieved from <http://www.fedex.com/us/software/pdf/FedEx_Ship_Manager_Software_Help_Guide_%28Dangerous_Goods_Hazardous_Materials%29_Jan_2011_12072010.pdf>, on Feb. 16, 2016, 18 pages.

Non Final Office Action received for U.S. Appl. No. 14/931,218, dated Sep. 21, 2018, 16 pages.

Anonymous, "Computer Network," *Wikipedia, the free encyclopedia*, Jan. 31, 2010, retrieved from <http://en.wikipedia.org/w/index.php?title=Computernetwork&oldid.341100015> on May 12, 2014.

International Searching Authority, International Search Report and Written Opinion for International Application No. PCT/US2016/013369, Mar. 8, 2016, 10 pages, European Patent Office, The Netherlands.

Office Action received for European Patent Application No. 16702279.7, dated Jul. 3, 2018, 6 pages.

International Preliminary Examining Authority, Written Opinion (Second) for International Application No. PCT/US2016/013369, Feb. 14, 2017, 7 pages, European Patent Office, Germany.

Final Office Action received for U.S. Appl. No. 14/931,218, dated Apr. 16, 2019, 25 pages.

* cited by examiner

ENFORCEMENT OF SHIPPING RULES

CROSS-REFERENCE TO RELATED APPLICATIONS

This application claims priority to U.S. Provisional Application No. 62/135,491 filed Mar. 19, 2015 and U.S. Provisional Application Ser. No. 62/135,496 filed Mar. 19, 2015, which are hereby incorporated herein in their entirety by reference.

BACKGROUND

Carriers, such as UPS, handle millions of deliveries on daily basis. Carriers typically arrange delivery of packages or mail between a consignor or a shipper and a consignee or a recipient. The carrier is responsible for enforcing different rules on different packages. Different types of packages often require a specific type of handling or that certain actions be taken prior to or during the shipping of such packages. For example, certain packages may require delicate handling during shipping. Other packages may not be allowed for shipping by the specific carrier.

Furthermore, applicable laws, rules, and regulations may prohibit the transportation of hazardous goods/items by carriers. To comply with such laws, rules, and regulations, the carrier must block the shipping of such goods/items. Further, large multi-national vendors naturally require enforcement of many (e.g., thousands of rules) different rules simultaneously. These rules are typically enforced based on information/data provided to the carrier by the consignor/shipper. Management and enforcement of such rules can prove cumbersome and require vast manpower resources. Therefore, there is a strong need in the industry for a system that can automatically facilitate processing and enforcement of such rules.

BRIEF SUMMARY

In general, one innovative aspect of the subject matter described herein can be embodied in methods that include the actions of displaying a shipping user interface for completing a shipping initiation process comprising providing a shipping user interface for display and for completing a shipping initiation process, the shipping user interface comprising a first user interface element for receiving a textual description of an item to be shipped; receiving one or more keywords from the first user interface element descriptive of the item to be shipped; accessing regulation data, the regulation data comprising a multi-level hierarchy of nodes arranged in a tree structure, wherein (a) each node specifying one or more keywords, (b) the tree structure comprises (i) one or more starting nodes having one or more child nodes and having no parent nodes, (ii) one or more intermediate nodes having at least one of a child node and a parent node, and (iii) one or more end nodes having at least one parent node and no child nodes; determining that a particular keyword from the received one or more keywords matches a keyword of a node in the hierarchy; determining a type of the node in the hierarchy, wherein the type of the node specifies whether the node is one of a starting node, an intermediate node, and an end node; identifying, based at least in part on the type of the node in the hierarchy, one or more actions to be performed; responsive to identifying the one or more actions to be performed, performing the one or more actions.

Other embodiments of this aspect include corresponding systems, apparatus, and computer programs, configured to perform the actions of the methods encoded on computer storage devices. These and other embodiments can each may optionally include one or more of the following features. Determining whether each node from the two or more child nodes comprises one or more keywords associated with blocking of shipping. Responsive to determining that a particular node from the two or more child nodes comprises one or more keywords associated with blocking of shipping, providing, to a user device, information that causes display of an interactive user interface element for confirming whether a package storing the item includes items corresponding to the one or more keywords for the particular node. Determining that the node is an end node associated with blocking shipping and in response blocking the shipping of a package storing the item; and providing a message in the user interface specifying that shipping was blocked because the package contains items not allowed for shipping and identifying one or more keywords associated with the end node within the message. Determining that the node is an end node not associated with blocking shipping and in response determining an intermediate node that is a parent of the end node; and providing a message in the user interface inquiring as to whether the package contains other items associated with the intermediate node. Determining that the node is an end node not associated with blocking shipping and in response determining a starting node that is a parent node of the end node; and providing a message in the user interface inquiring as to whether the package contains other items associated with the starting node. Determining that the node is an intermediate node not associated with blocking shipping and having one or more child nodes associated with blocking shipping; identifying particular intermediate nodes that are child nodes of the intermediate node and having only child nodes associated with blocking of shipping; identifying particular end nodes that are child nodes of the intermediate node and are associated with blocking of shipping, wherein the particular child nodes have immediate parent intermediate nodes having one or more child nodes that are not associated with blocking of shipping; and providing a message in the user interface inquiring as to whether the package contains other items associated with the particular intermediate nodes and inquiring as to whether the package contains items associated with the particular end nodes. Determining that the node is an intermediate node not associated with blocking shipping and having only child nodes not associated with blocking shipping and in response identifying a particular intermediate node that is a parent of the intermediate node; identifying second intermediate nodes that are child nodes of the particular intermediate node and having only child nodes associated with blocking of shipping; identifying second end nodes that are child nodes of the particular intermediate node and are associated with blocking of shipping, wherein the second end nodes have immediate parent intermediate nodes having one or more child nodes that are not associated with blocking of shipping; providing a message in the user interface inquiring as to whether the package contains other items associated with the second intermediate nodes and inquiring as to whether the package contains items associated with the second end nodes. Determining that the node is an intermediate node not associated with blocking of shipping and having only child nodes not associated with blocking shipping and in response identifying a particular starting node that is a parent of the intermediate node; identifying second intermediate nodes that are child nodes of the particular starting node and having only child nodes associated with blocking of shipping; identifying second end nodes that are child nodes of the particular starting node and are associated with blocking of shipping, wherein the second end nodes have immediate parent intermediate nodes having one or more child nodes that are not associated with blocking of shipping; providing a message in the user interface inquiring as to whether the package contains other items associated with the second intermediate nodes and inquiring as to whether the package contains items associated with the second end nodes. Determining that the node is an intermediate node associated with blocking shipping and in response blocking shipping of the package. Determining that the node is a starting node not associated with blocking shipping and having one or more child nodes associated with blocking of shipping; identifying particular intermediate nodes that are child nodes of the starting node and having only child nodes associated with blocking of shipping; identifying particular end nodes that are child nodes of the starting node and are associated with blocking of shipping, wherein the particular child nodes have immediate parent intermediate nodes having one or more child nodes that are not associated with blocking of shipping; and providing a message in the user interface inquiring as to whether the package contains other items associated with the particular intermediate nodes and inquiring as to whether the package contains items associated with the particular end nodes. Determining that the node is a starting node associated with blocking shipping and in response blocking shipping of the package.

Other embodiments of this aspect include corresponding systems, apparatus, and computer programs, configured to perform the actions of the methods, encoded on computer storage devices.

Particular embodiments of the subject matter described herein can be implemented so as to realize one or more of the following advantages. Facilitating more efficient enforcement of shipping rules. The invention provides means for faster processing of shipping information/data, reducing the wait time associated with shipping packages and improving the overall user experience. Similarly, multi-step guidance is provided to interface operators, reducing chance for erroneous shipping or shipping that is not in compliance with current rules and regulations.

The details of one or more embodiments of the subject matter described herein are set forth in the accompanying drawings and the description below. Other features, aspects, and advantages of the subject matter will become apparent from the description, the drawings, and the claims.

BRIEF DESCRIPTION OF THE DRAWINGS

Figure 1:
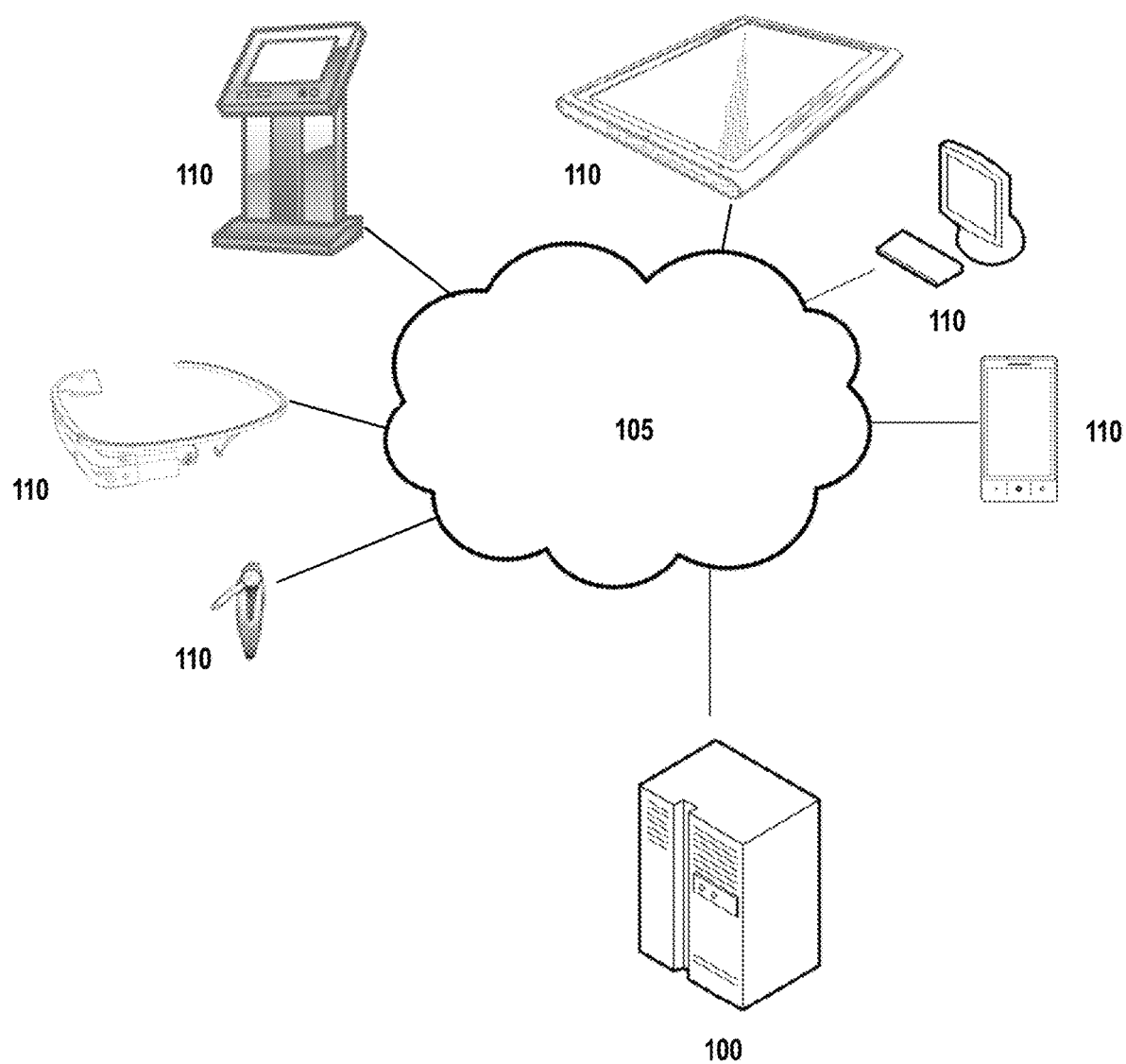
Figure 2:
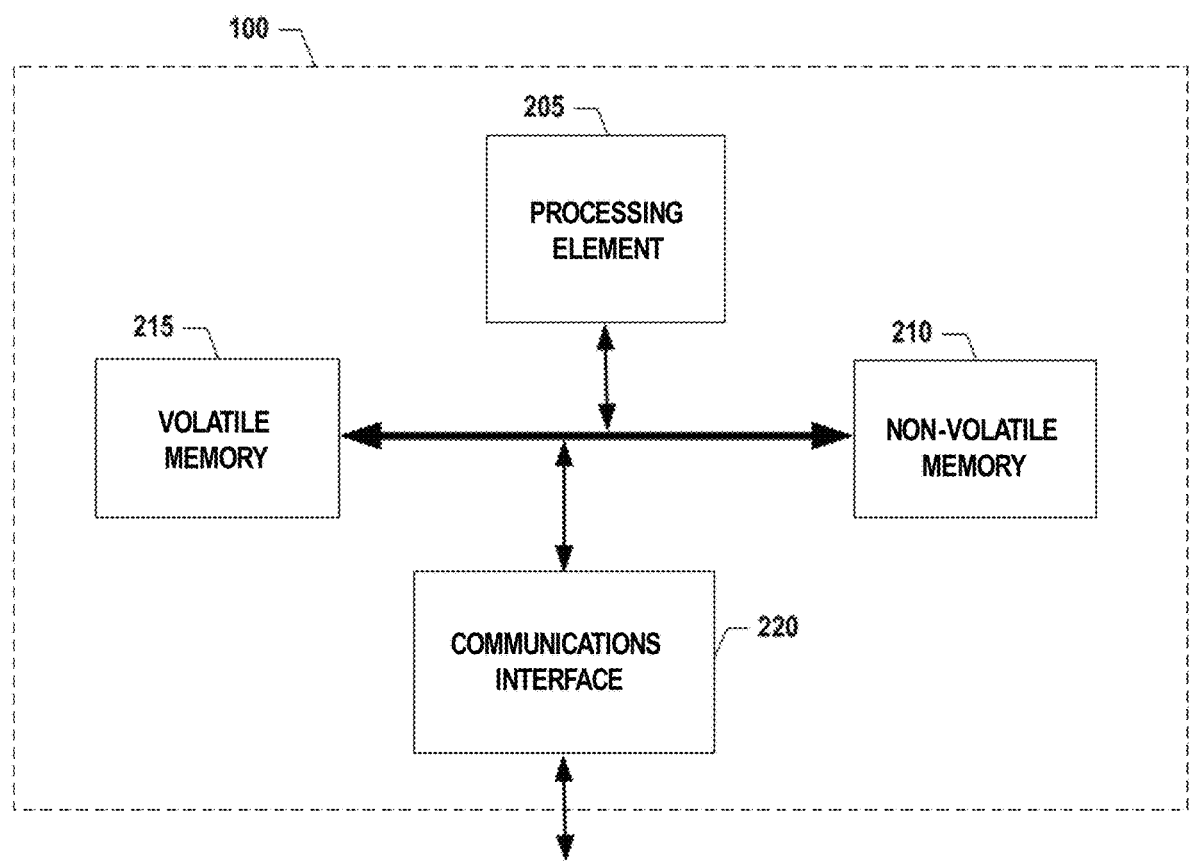
Figure 3:
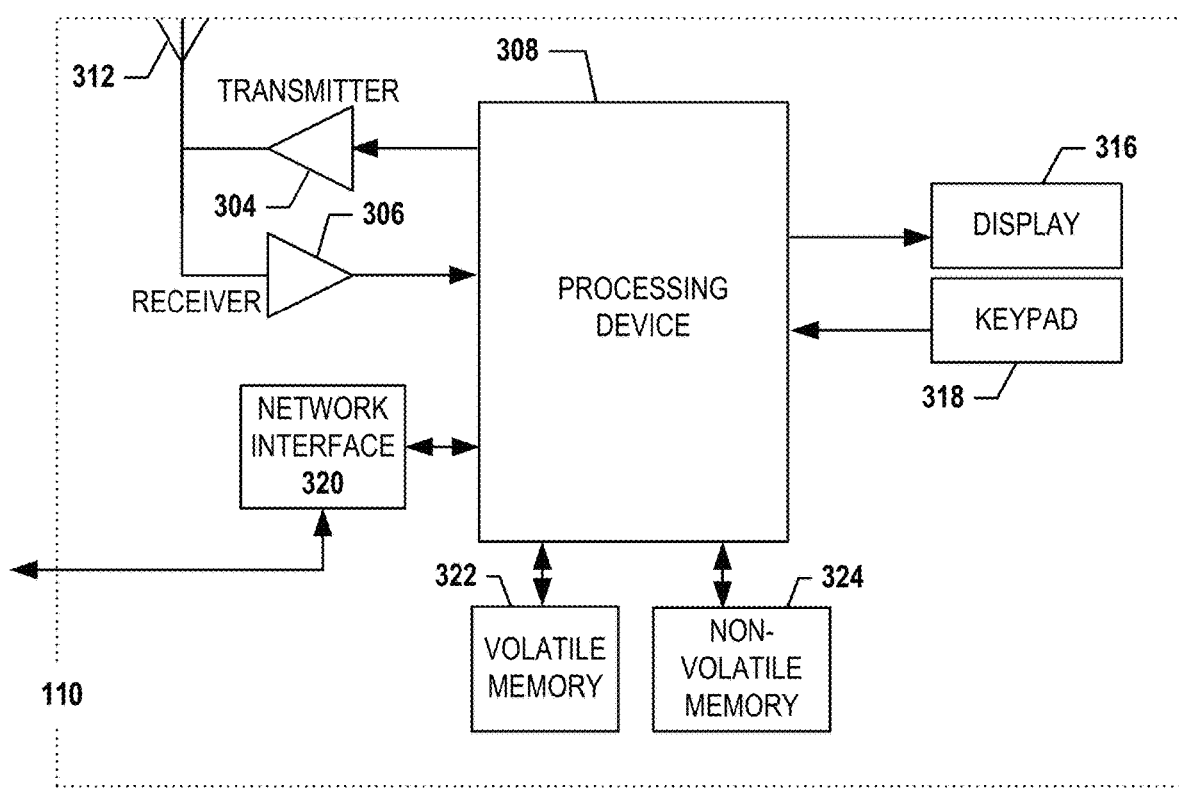
Figure 6:
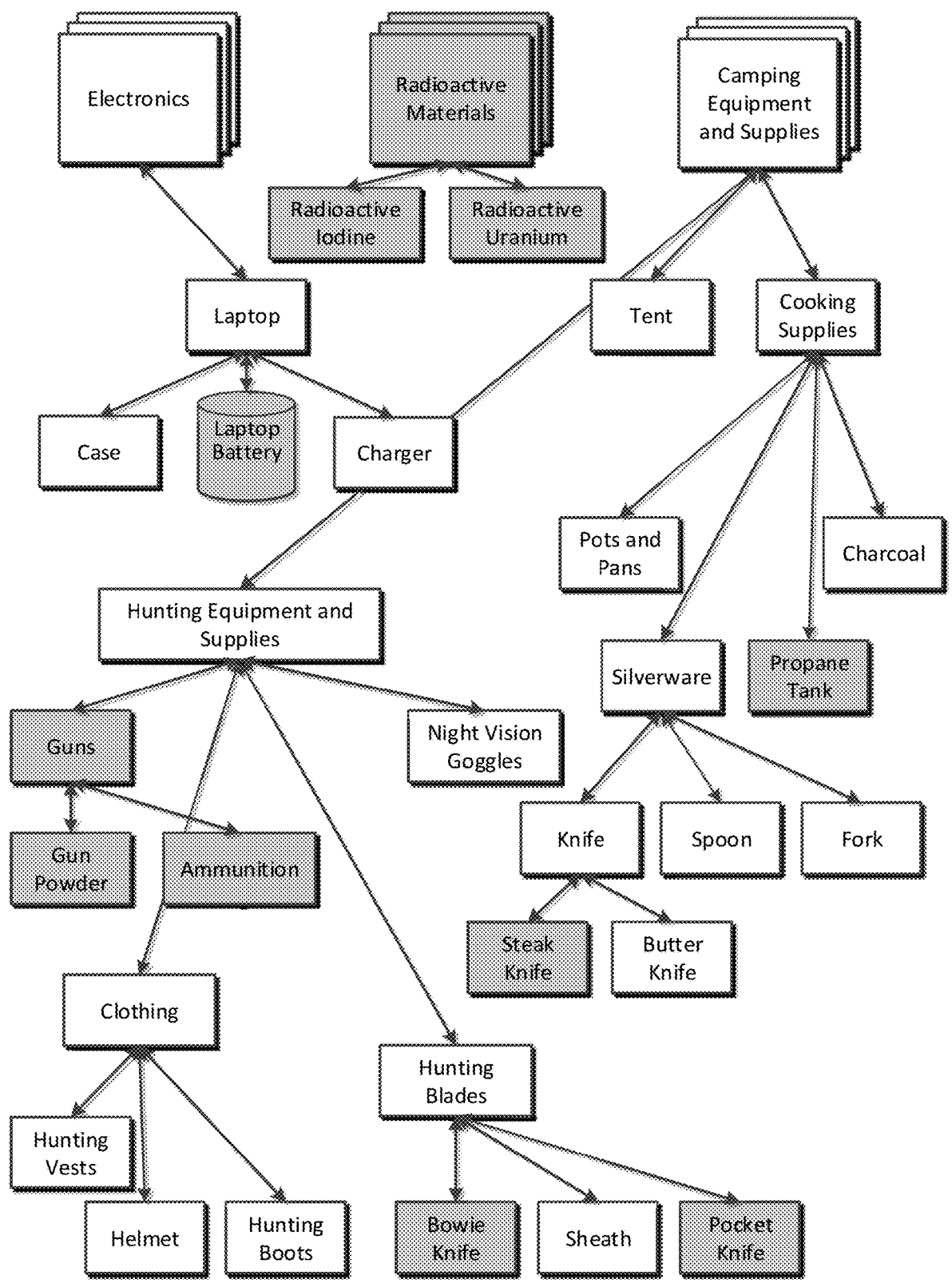

Having thus described the invention in general terms, reference will now be made to the accompanying drawings, which are not necessarily drawn to scale, and wherein:

FIG. 1 is an overview of a system that can be used to practice embodiments of the present invention;

FIG. 2 is an exemplary schematic diagram of a carrier computing entity according to one embodiment of the present invention;

FIG. 3 is an exemplary schematic diagram of a user computing entity according to one embodiment of the present invention;

FIG. 6 illustrates an exemplary multi-level hierarchy specifying regulation information/data;

FIGS. 7, 8, 10A-10C, 11A-11D, and 12A-12B are flow charts illustrating various procedures and operations that may be completed in accordance with various embodiments of the present invention; and FIGS. 4, 5, 9A-9B, and 10D illustrate example views of the shipping user interface, in accordance with various embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of an exemplary embodiment of the present invention. As shown in FIG. 1, this particular embodiment may include one or more carrier computing entities 100, one or more networks 105, and one or more user computing entities 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Carrier Computing Entity

FIG. 2 provides a schematic of a carrier computing entity 100 according to one embodiment of the present invention. A carrier may be a traditional carrier, such as United Parcel Service (UPS), FedEx, DHL, courier services, the United States Postal Service (USPS), Canadian Post, freight companies (e.g. truck-load, less-than-truckload, rail carriers, air carriers, ocean carriers, etc.), and/or the like. However, a carrier may also be a nontraditional carrier, such as Amazon, Google, Uber, ride-sharing services, crowd-sourcing services, retailers, and/or the like. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the carrier computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the carrier computing entity 100 may communicate with user computing entities 110 and/or a variety of other computing entities.

As shown in FIG. 2, in one embodiment, the carrier computing entity 100 may include or be in communication with one or more processing elements 205 (also referred to as processors, processing circuitry, and/or similar terms used herein interchangeably) that communicate with other elements within the carrier computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the carrier computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In one embodiment, the carrier computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the carrier computing entity 100 with the assistance of the processing element 205 and operating system.

As indicated, in one embodiment, the carrier computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the carrier computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the carrier computing entity 100 may include or be in communication with one or more input elements, such as a keyboard input, a mouse input, a touch screen/display input, motion input, movement input, audio input, pointing device input, joystick input, keypad input, and/or the like. The carrier computing entity 100 may also include or be in communication with one or more output elements (not shown), such as audio output, video output, screen/display output, motion output, movement output, and/or the like.

As will be appreciated, one or more of the carrier computing entity's 100 components may be located remotely from other carrier computing entity 100 components, such as in a distributed system. Furthermore, one or more of the components may be combined and additional components performing functions described herein may be included in the carrier computing entity 100. Thus, the carrier computing entity 100 can be adapted to accommodate a variety of needs and circumstances. As will be recognized, these architectures and descriptions are provided for exemplary purposes only and are not limiting to the various embodiments.

2. Exemplary User Computing Entity

A user may be an individual, a family, a company, an organization, an entity, a department within an organization, a representative of an organization and/or person, and/or the like. In one example, users may be carrier personnel, consignors/shippers, consignees/recipients, and/or the like. For instance, a user may operate a user computing entity 110 that includes one or more components that are functionally similar to those of the carrier computing entity 100. FIG. 3 provides an illustrative schematic representative of a user computing entity 110 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties. As shown in FIG. 3, the user computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the carrier computing entity 100. In a particular embodiment, the user computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 110 may operate in accordance with multiple wired communication standards and protocols, such as those described above with regard to the carrier computing entity 100 via a network interface 320.

Via these communication standards and protocols, the user computing entity 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 110 can also download changes, add-ons, and updates, for instance, to its firmware, software (e.g., including executable instructions, applications, program modules), and operating system.

According to one embodiment, the user computing entity 110 may include location determining aspects, devices, modules, functionalities, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire information/data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information/data can be determined by triangulating the user computing entity's 110 position in connection with a variety of other systems, including cellular towers, Wi-Fi access points, and/or the like. Similarly, the user computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user computing entity 110 to interact with and/or cause display of information/data from the carrier computing entity 100, as described herein. The user input interface can comprise any of a number of devices or interfaces allowing the user computing entity 110 to receive information/data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other user interface for communicating with the carrier computing entity 100 and/or various other computing entities.

In another embodiment, the user computing entity 110 may include one or more components or functionality that are the same or similar to those of the carrier computing entity 100, as described in greater detail above. As will be recognized, these architectures and descriptions are provided for exemplary purposes only and are not limiting to the various embodiments.

III. Exemplary System Operation

As described above, the carrier computing entity 100 and/or user computing entity 110 may be configured for storing information/data associated with an item, providing information/data associated with a good/item to a user, providing tools for a user accessing information/data associated with a good/item and/or aiding in user access of information/data associated with an item. According to various embodiments, the carrier computing entity 100 and/or user computing entity 110 provides and/or aids in the access of information/data in accordance with user instructions and/or input received via the carrier computing entity 100 and/or user computing entity 110 (e.g., via a user interface). The user interface may be accessible from a user computing entity 110 (e.g., in communication with the carrier computing entity 100 via the network 105). For example, in various embodiments, a user may log in to the carrier computing entity 100 from a user computing entity 110 (e.g., by opening a log-in page and entering a user ID and password using display 316 and keypad 318). The carrier computing entity 100 may be configured to recognize any such log-in request, verify that user has permission to access the system (e.g., by confirming the user ID and password are valid), and present/provide the user with a user interface (e.g., displayed on display 316). In other embodiments, user log-in is not required to access the user interface.

In many cases, the inventors have determined that automatic enforcement of shipping rules is constrained by technological obstacles unique to the electronic nature of the enforcement, such as constraints on data storage, accuracy of data available, machine communication and processor resources. The inventors have identified that being able to automatically and accurately enforce shipping rules and regulations, can greatly enhance the performance of systems that facilitate shipping of packages and items. Being able to enforce shipping rules automatically and accurately increases the consumer satisfaction and reduces waiting periods associated with shipping items. In turn, the accurate and automatic enforcement of shipping rules increases the efficiency of systems facilitating shipping of packages and items. For example, the processing power required by the system facilitating shipping of packages and items may be reduced. Similarly, the number of user errors associated with enforcement of shipping rules may be reduced.

The inventors have therefore determined that existing systems for facilitating shipping of packages and items fail to accurately and efficiently address these issues. As a result of these problems and others that may arise from time to time, delays and inefficiencies may be introduced into the shipping process, which in turn may be reflected on user satisfaction and overall revenue generated. The inventors identified methods and systems for automatically and accurately enforcing shipping rules and regulations. As the result the systems and methods described above may be used to enhance security and enforcement of shipping rules. The methods and systems provide means for faster processing of shipping information/data, reducing the wait time associated with shipping packages and improving the overall user experience. Similarly, multi-step guidance is provided to interface operators, reducing chance for erroneous shipping or shipping that is not in compliance with current rules and regulations.

1. Exemplary User Interface

Figure 4:
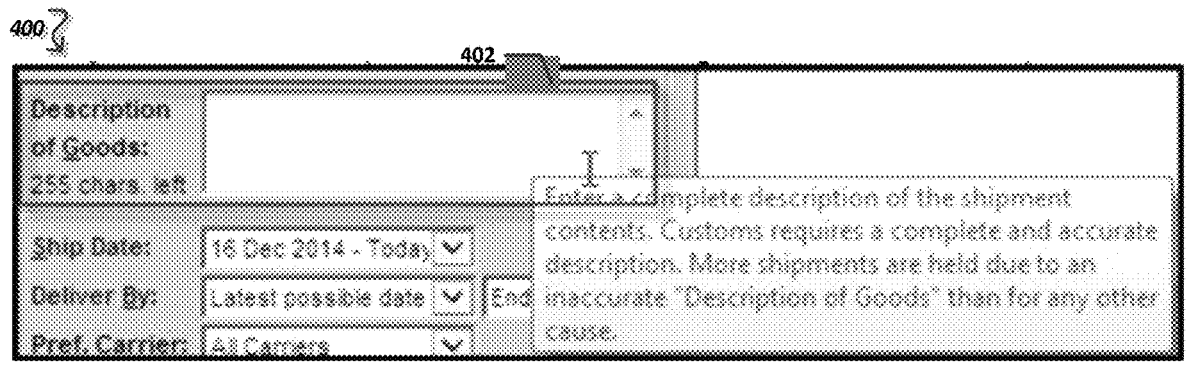

FIG. 4 depicts an example user interface element 400 of a user interface for facilitating enforcement of shipping rules (including applicable laws, rules, and regulations) for items/contents of packages. As will be recognized and described herein, the user computing entity 110 displaying the user interface may be in communication with the carrier computing entity 100 to cause display of information/data and/or interaction/communication between the entities. As will be recognized, a package may be any tangible and/or physical object. In one embodiment, a package may be one or more parcels, envelopes, bags, containers, loads, crates, goods/items banded together, pallets, drums, and/or similar words used herein interchangeably. Such packages, items, and/or contents may include the ability to communicate (e.g., via a chip (e.g., an integrated circuit chip), RFID, NFC, Bluetooth, Wi-Fi, and any other suitable communication techniques, standards, or protocols) with one another and/or communicate with various computing entities for a variety of purposes. In this regard, in some example embodiments, such packages, items, and/or contents may communicate send "to" address information/data, received "from" address information/data, unique identifier codes, and/or various other information/data. The user interface element 400 shown in FIG. 4 is for receiving shipping information/data as input from a user of a user computing entity 110. In one implementation, a textual information/data entry user interface element 402 for receiving description of goods/items to be shipped is presented to a user. In some implementations, the user is a shipping customer, such as a consignor/shipper, consignee/recipient (both referred to herein interchangeably as customers). In some implementations, the user is a shipping agent or carrier personnel responsible for overseeing the shipping initiation process. For example, the user may be an agent of the carrier.

In some implementations, the user interface element 402 can receive a configurable number of characters or letters as a description of the goods/items to be transported by the carrier via the package. For example, the user interface element 402 may be configured to receive a maximum of 255 characters or letters. In some implementations, spaces and other characters may not be counted against the number of maximum characters or letters. In some implementations, other shipping information/data is also entered in user interface element 400. For example, the agent may enter a shipping date for the package prepared for shipping. Similarly, the agent may enter a requested delivery date provided by the customer. Other information/data required for shipping may also be entered using user interface element 400, such as origin, destination, service level (Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like), consignor, consignee, contents, carrier, and/or the like.

Figure 5:
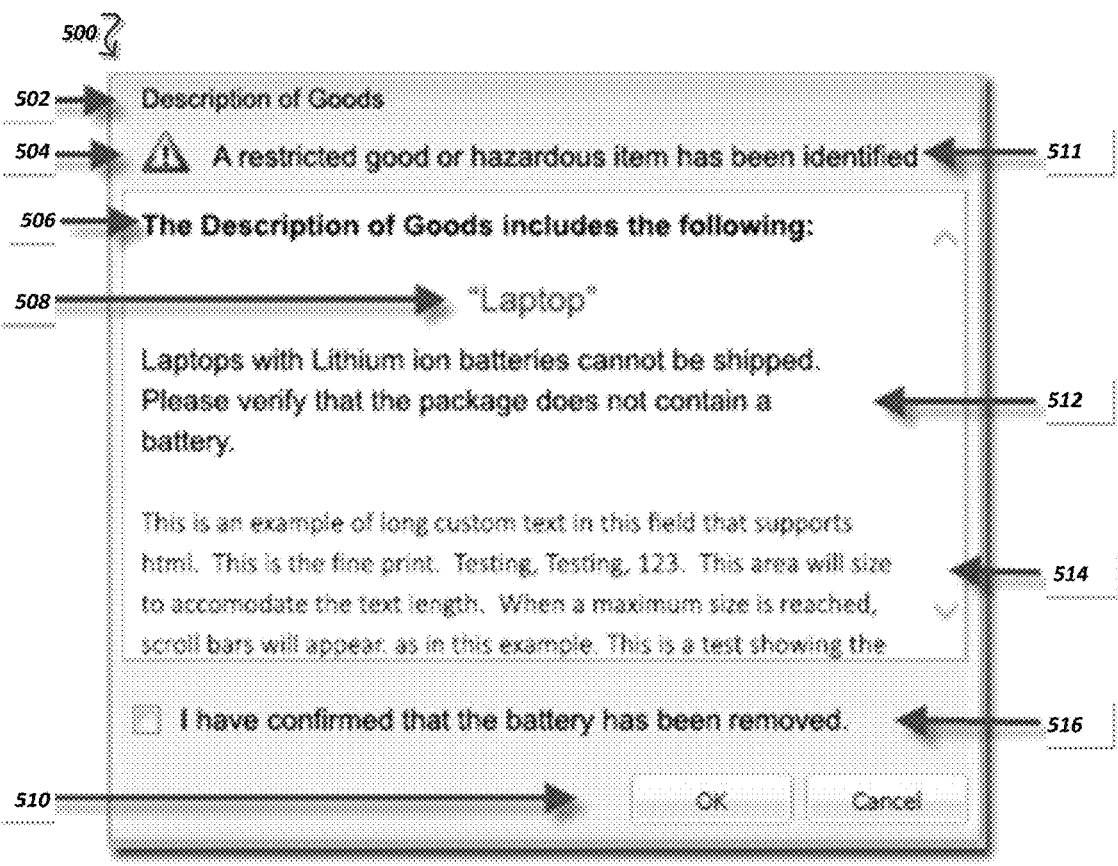

According to the information/data provided as input via the user interface element 400, different responses are provided. In some implementations, the user computing entity 110 (in communication with the carrier computing entity 110) can generate and provide different responses for display to the user. In some implementations, the carrier computing entity (and/or various other computing entities) may generate and provide the different responses to a consumer device for display. In some implementations, the provided responses are instructions to the user. For example, a response may instruct the agent to perform one or more actions prior to shipping the item. For example, the response may be instructions to the agent to verify that batteries have been removed when a laptop is being shipped. FIG. 5 is a depiction of an example user interface element for facilitating enforcement of shipping rules. In particular, FIG. 5 is an example user interface element for providing a response to provided shipping information/data. In some implementations, user interface element 500 is generated, in real-time, in response to the provided shipping information/data. For example, the user interface element 500 may be generated in real-time by an appropriate computing entity (e.g., a user computing entity, a carrier computing entity).

User interface element 502 specifies a title for the response displayed via user interface element 500. The title identifies a subject to which the response is directed. For example, the title "Description of Goods" specifies that the response provided by user interface element 500 relates to a received description of goods. An icon 504 and header text 511 may also be presented within user interface element 500. For example, the header text 511 may describe what prompted presentation of user interface element 500. Similarly, icon 504 may be presented to further support header text 511. For example, the header text 511 may be "A restricted good/item or hazardous good/item has been identified" to indicate that a hazardous good/item was identified within the provided description of goods. A "hazardous" symbol 504 may be presented along with header text 511. Other symbols may be presented along with different header texts. For example, a warning symbol may be presented along with a warning text, such as "Your package may include hazardous materials."

User interface element 506 may be a body header for a specific type of response. For example, user interface element 506 may specify that the description of goods/items includes a good/item that is not allowed for shipping, or a good/item that requires particular steps be performed prior to the good/item being shipped. User interface element 508 identifies one or more goods/items that triggered the response. For example, a response presented in user interface element 500 may be triggered because the words "laptop" or "propane tank" were identified within the description of goods/items provided via interface element 402. The identified words are then displayed at user interface element 508. User interface element 512 is body text that identifies one or more rules that resulted in the respective response being triggered. For example, the text at user interface element 512 may state that "Laptops with Lithium ion batteries cannot be shipped. Please verify that the package does not contain a battery." Similarly, the text at user interface element 512 may simply state that "Propane tanks are not allowed for shipping." User interface element 514 allows users to scroll up and down to view other displayed text.

User interface element 516 provides text and an element for user interaction. For example, user interface element 516 may state "I have confirmed that the battery has been removed." The user interface element 516 may also provide a user interface element for user interaction allowing users to confirm that the action described in the text has been performed. For example, user interface element 516 may include an interaction element (e.g., check box) that allows the user to confirm that the battery was removed from the laptop. User interface element 500 may include dialogue buttons 510. The dialogue buttons may allow the user to confirm the interaction with element 516. The dialogue buttons may also allow the user to terminate the shipping initiation process. In some implementations, user interaction with one or more dialogue buttons 510 may be disallowed prior to interaction with user interface element 516. For example, if the user did not interact with check box 516 confirming that the battery of the laptop has been removed, the "OK" dialogue button may be greyed out. This prevents users from proceeding with the shipping initiation process without the confirmation that the issues prompting display of the current response via user interface element 500 have been resolved. It is understood that user interface element 500 may generate automatic messages identifying specific issues that require the attention of users to resolve. These steps described above may be performed by any appropriate entity. For example, the steps above may be performed by a user computing entity, a carrier computing entity, or a combination of both entities.

2. Exemplary Process for Enforcement of Shipping Rules Based on Multi-Level Hierarchy of Regulation Information/Data FIG. 6 depicts an exemplary multi-level hierarchy specifying regulation information/data. Each node in the hierarchy may be a parent or a child of other nodes. For example, the "Laptop" node of FIG. 6 is a child of the "Electronics" node and a parent to each of the "Case," "Laptop Battery," and "Charger" nodes. In some implementations, a parent node may be associated with a keyword descriptive of a type of the good/item. In some implementations, child nodes may be associated with goods/items that belong to the type of good/item specified by the parent node. For example, the node "Tent" is associated with a good/item that belongs to the "Camping Equipment and Supplies" type of goods/items. It should be understood that a parent node need not be an immediate parent node. For example, the "Camping Equipment and Supplies" node is a parent node to the "Cooking Supplies," "Pots and Pans," and "Butter Knife" nodes. However, the "Camping Equipment and Supplies" node is an immediate parent to "Cooking Supplies" node and not an immediate parent node to the "Pots and Pans," and "Butter Knife" nodes.

In some implementations, the multi-level hierarchy may include 3 types of nodes. The first type of nodes may be "starting nodes." In some implementations, starting nodes are nodes that do not have parent nodes. For example, the nodes "Electronics," "Radioactive Materials," and "Camping Equipment and Supplies" are starting nodes. A second type of nodes may be intermediate nodes. In some implementations, intermediate nodes may be nodes that have, at least, one child node and one parent node. For example, the "Hunting Equipment and Supplies" and "Cooking Supplies" nodes are intermediate nodes. A third type of nodes may be end nodes. In one implementations, end nodes may be nodes that have no child nodes. For example, the nodes "Charger," "Pots and Pans," and "Ammunition" are end nodes.

Shipping rules may be determined from the regulation information/data of FIG. 6. For example, goods/items that are not allowed for shipping are shown in the hierarchy in grey. For example, the goods/items "Laptop Battery," "Ammunition" and "Propane Tank" are not allowed for shipping according to FIG. 6. The node associated with good/item and keyword "Laptop Battery" is shown having a different shape. This shape in combination with the child-parent relationship between the "Laptop Battery" and the "Laptop" nodes indicate that laptop battery good/item may be physically inside the laptop item. Since laptops are allowed for shipping and laptop batteries are not, regulations may require a particular procedure to be performed in association with shipping a laptop. For example, regulations may require removal of the laptop battery prior to shipping the laptop. In some implementations, carrier personnel may be required to verify that the battery was removed from the laptop prior to shipping the laptop. Similarly, carrier personnel may require to verify that hunting equipment and supplies to be shipped do not include any guns. The carrier computing entity 110 may traverse the multi-level hierarchy to determine operations to be performed in order to enforce shipping rules. In some implementations, these operations are performed automatically by the carrier computing entity 110. In some implementations, the carrier computing entity 110 may provide instructions to carrier personnel or a user to perform certain actions in order to enforce shipping rules.

Figure 7:
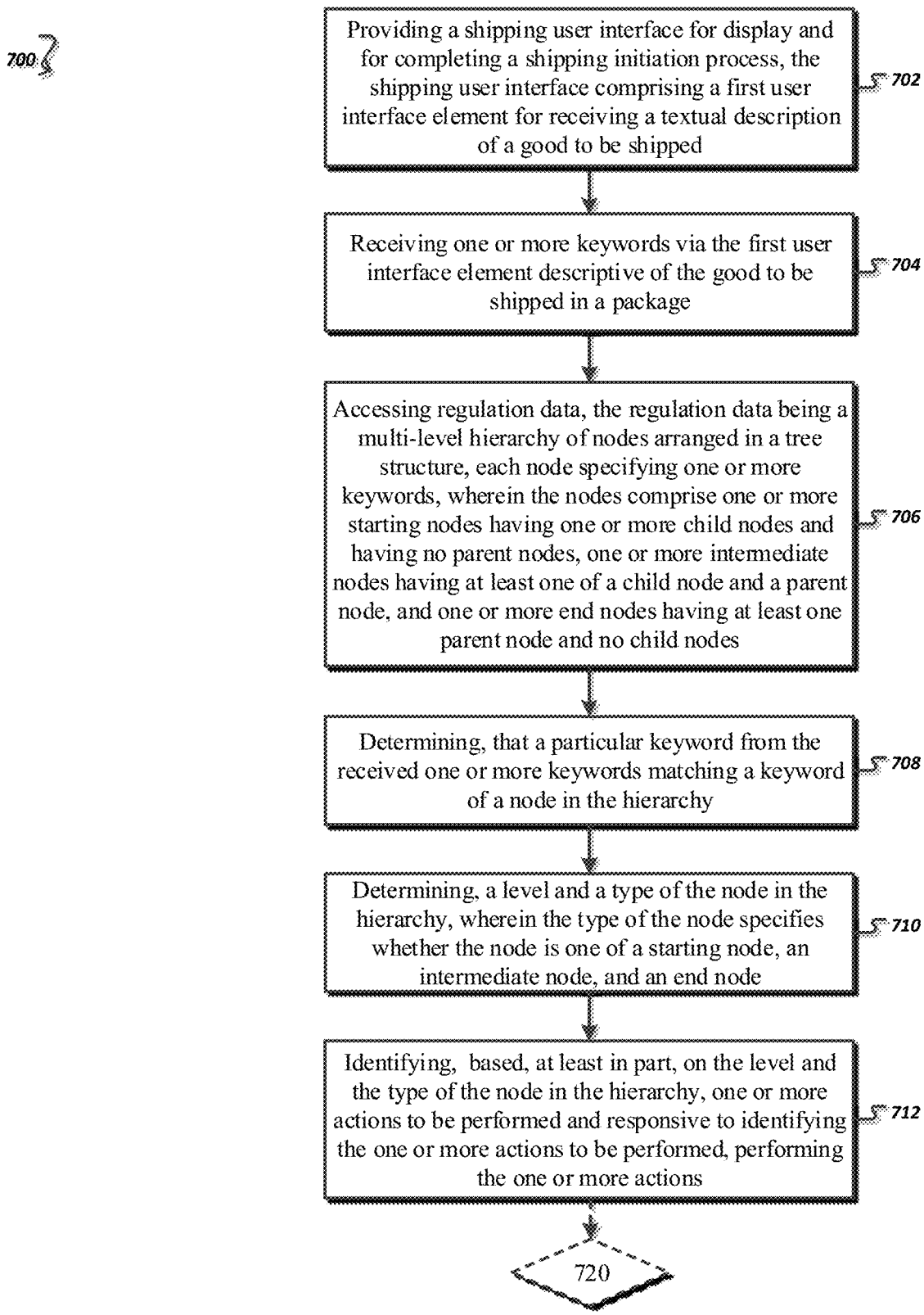
Figure 8:
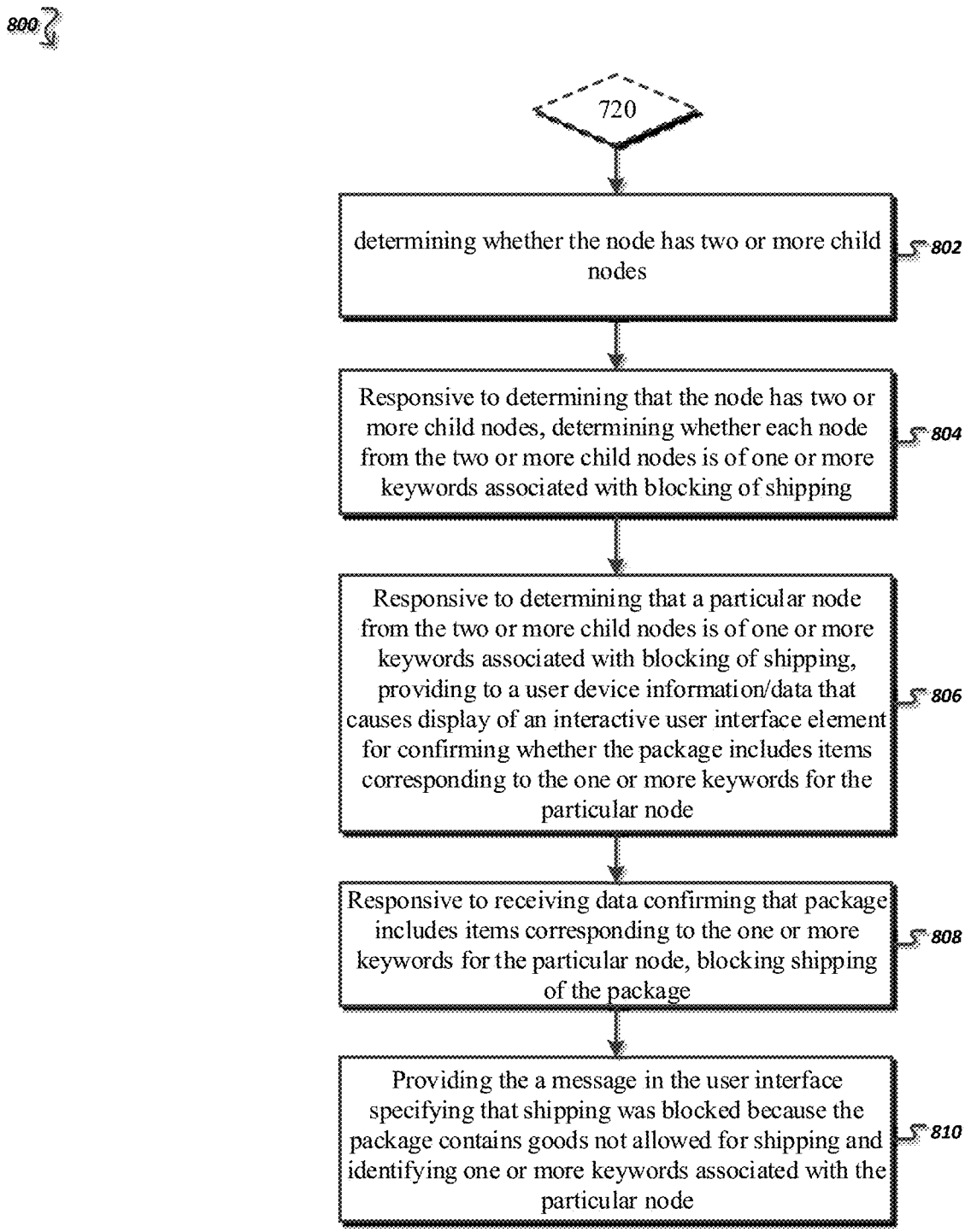

FIG. 7 is a flow chart of an example process 700 for enforcement of shipping regulations and/or rules. The processes 700 begins with providing a shipping user interface for display and for completing a shipping initiation process, the shipping user interface comprising a first user interface element for receiving a textual description of a good to be shipped (702). For example, a user interface element similar to user interface element 400 may be provided, by carrier computing entity 110 to a consumer device 110 or a carrier device 110, for receiving information/data associated with a package to be shipped. For example, a user may use one or more input elements, as described above, to input information/data associated with the goods/items to be shipped. For instance, a user may use a keyboard or other input means to provide textual information/data describing the goods/items to be shipped. In some implementations, the user is a shipping agent/carrier personnel. In some implementations, the user is a customer (consignor/shipper, consignee/recipient).

The process 700 may continue with receiving one or more keywords via the first user interface element descriptive of the good to be shipped in a package (704). For example, a customer and/or carrier personnel may provide information/data describing goods/items within the package to be shipped. For example, the information/data may include text specify that the package includes hunting equipment and supplies. The text may include keywords similar to the keywords of nodes in the hierarchy.

In turn, the process 700 may continue with accessing regulation information/data, the regulation information/data being a multi-level hierarchy of nodes arranged in a tree structure, each node specifying one or more keywords, wherein the nodes comprise one or more starting nodes having one or more child nodes and having no parent nodes, one or more intermediate nodes having at least one of a child node and a parent node, and one or more end nodes having at least one parent node and no child nodes (706). For example, the carrier computing entity 110 may access regulation information/data in a multi-level hierarchy similar to the exemplary regulation information/data of the hierarchy shown in FIG. 6. In some implementations, the hierarchy may include one or more starting nodes having one or more child nodes and no parent nodes. For example, the "Electronics" node of FIG. 6 is a starting node. In some implementations, the hierarchy may include one or more intermediate nodes having at least one parent node and at least one child node. For example, the "Laptop" node of FIG. 6 is an intermediate node. In some implementations, the hierarchy may include one or more end nodes having at least one parent nodes and no child nodes. For example, the "Butter knife" and "Steak knife" nodes of FIG. 6 are end nodes. In some implementations, the hierarchy may include one or more embedded nodes. In one implementations, embedded nodes may be nodes for goods/items that are a portion of a good/item associated with their parent nodes. For example, a laptop battery may be a portion of laptop. Accordingly, the node "Laptop Battery" may be an embedded child node of the "Laptop" node.

The process 700 may continue with determining, that a particular keyword from the received one or more keywords matching a keyword of a node in the hierarchy (708). For example, the user may provide a textual description including the keyword tent that exactly matches a keyword associated with the node "tent." In some implementations, a partial match of keywords may be used to associate a textual description with a node. For example, a textual description reciting "Camping Gear" may be associated with the "Camping Equipment and Supplies" node based on a partial match. For example, "Camping Gear" and "Camping Equipment and Supplies" may be a partial match because the word "Camping" appears in both. In some implementations, partial matches may be based on variations of keywords. For example, a textual description of "cookware" may be considered a partial match with the keywords associated with "Cooking Supplies" node. Because a portion of the text keyword "cookware" matches a portion of the keyword "Cooking Supplies" the two keywords may be considered a partial match. The matching portion between the two keywords in that example is the keyword "cook." In some implementations, multiple keywords are stored in association with a single node. For example, variations of a keyword may be stored in association with a node (e.g., cook, cooking, cookware, cooking supplies, cooking utensils, and/or the like). Similarly, the keywords "Laptop" and "Laptops" may both be stored in association with the node "Laptop."

The process 700 may continue with determining a level and a type of the node in the hierarchy, wherein the type of the node specifies whether the node is one of a starting node, an intermediate node, and an end node (710). The carrier computing entity 100 may determine a type for the identified node having the matching keyword with the textual description. As described above, the type of the node may specify whether a node is a starting node, an intermediate node, or an end node. The type may also specify if a node is an embedded node for a parent of the node. In some implementations, the level of the node may be specified by the number of nodes encountered when traversing the hierarchy in a top-down manner from a parent starting node for the node before reaching the node. For example, the node "Knife" is separated from its parent starting node "Camping Equipment and Supplies" by two intermediate nodes ("Silverware" and "Cooking Supplies"). Accordingly, traversing the nodes in top-down manner result in encountering 4 nodes (including the "Knife" node) to reach the "Knife" node. Therefore, the "Knife" node may be determined to be at level 4. In some implementations, the level may determine by traversing the hierarchy in a bottom-up fashion to determine the number of node encountered starting at the deepest end node before reaching the node. In such example, the node "Knife" may be considered level 2.

The process 700 may continue with identifying, based at least in part on the level and the type of the node in the hierarchy, one or more actions to be performed and responsive to identifying the one or more actions to be performed, performing the one or more actions (712). For example, with reference to the "Knife" node example above, the action may be to present a user interface element inquiring as to whether the knife within the package is a steak knife. In one implementation, the action may be to present a user interface element requesting removal of any batteries from a laptop being shipped in the package.

In some implementations, the process 700 may determine, based on at least a portion of the description keywords matching a node keyword, that multiple actions are to be taken. For example, the process 700 may determine that based on text keyword "Bowie Knife" matching the text keyword "Bowie Knife" from the index that (1) shipping is to be blocked and (2) and a provide warning action is to be taken. In some implementations, the carrier computing entity 100 may block the shipping and provide a warning message to a consumer device 110 for display. In some implementations, the process 700 may determine that shipping is to be blocked based on keyword matching and the shipping destination. For example, the process 700 may determine that based on a portion of the text keyword "banknote" matching a portion of the text keyword "banknotes" from a hierarchy (not shown) that shipping is to be blocked if the shipping address is within the country of France. For example, the process 700 may block the shipping if the shipping address is in Paris, France. On the other hand, the process 700 may allow the shipping if the shipping address is in Rome, Italy. Actions associated with each node, can be defined and maintained by the carrier. The actions may be customized according to the shipping rules and regulations. The hierarchy may be updated frequently to incorporate new nodes associated with new keywords. The carrier computing entity may receive lists of updated regulations and rules associated with particular keywords or goods/items. The carrier computing entity 100 may then process the list to incorporate new nodes associated with new keywords and regulations. Similarly, the carrier computing entity 100 may update nodes with additional regulations and rules. Table A below shows an exemplary keyword index or a keyword list associating one or more actions with keywords, that the carrier computing entity may receive for updating the hierarchy shown in FIG. 6.

TABLE A

| Keyword | Action(s) |
| --- | --- |
| Camping Equipment | Provide a warning specifying that the user package may include specific goods/items that are deemed hazardous. |
| Radioactive Iodine | Block Shipping. Provide a warning specifying that the user package includes specific goods/items (Radioactive Iodine) that are deemed hazardous. |
| Laptop | Provide a warning specifying that laptop batteries must be removed from laptops prior to shipping. Provide a confirmation element for confirmation that the laptop batteries were removed, wherein interaction with the confirmation element causes allowance of shipping. |
| Explosive | Block shipping. Inform the authorities. |
| Air Bag | Block shipping. Provide a warning specifying that the user package includes specific goods/items (Air Bag) that are deemed hazardous. |
| Fruit and/or Vegetable | Block international shipping only. |
| Banknote | Block shipping to France only. |
| Card deck | Provide a confirmation element for specifying whether the card deck is complete. Block shipping to Germany only if deck is incomplete. |

In some implementations, the process 700 may continue with the optional steps of process 800. The process 700 may continue with the first step of process 800 of determining whether the node has two or more child nodes (802). For example, with reference to the example above where the node is the "Cooking Supplies" node, the carrier computing entity may determine the "Cooking Supplies" node has more than two child nodes. The process 800 may then, in response, continue with determining whether each node from the two or more child nodes is of one or more keywords associated with blocking of shipping (804). For example, the carrier computing entity 100 may determine that the nodes "Propane Tank" and "Steak Knife" are both child nodes of the node "Cooking Supplies" that are not allowed for shipping. Note the node "Propane Tank" is an immediate node and/or direct child of the node "Cooking Supplies." The node "Steak Knife," however, is an indirect and/or non-immediate child of the "Cooking Supplies" node. In other words, the node "Steak Knife" is a child node of the "Cooking Supplies" node that is separated from the "Cooking Supplies" node by one or more intermediate nodes when traversing the hierarchy.

Figure 9A:
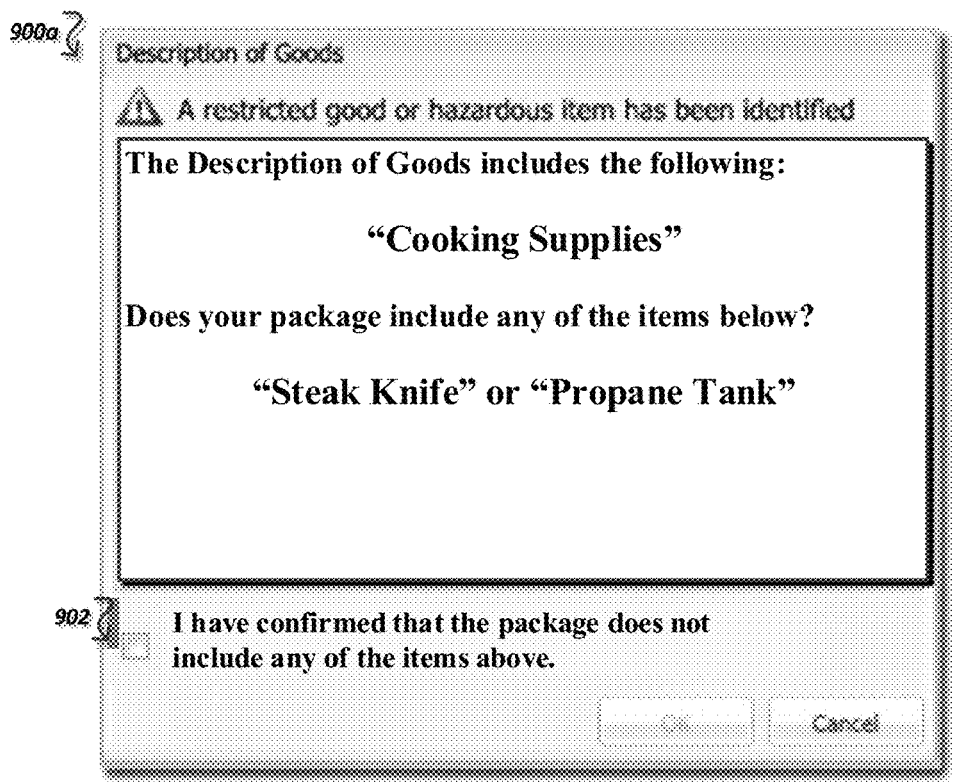
Figure 9B:
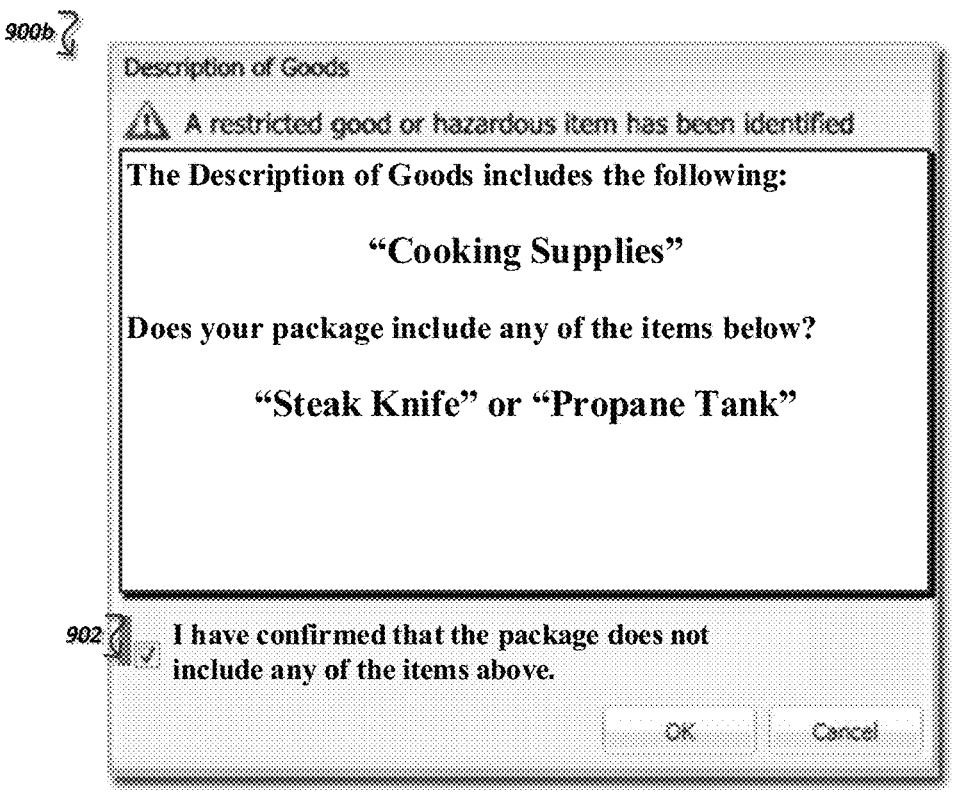

The process 800 may continue with, responsive to determining that a particular node from the two or more child nodes is of one or more keywords associated with blocking of shipping, providing to a user device (e.g., user computing entity 110) information/data that causes display of an interactive user interface element for confirming whether the package includes goods/items corresponding to the one or more keywords for the particular node (806). For example, with reference to the "Cooking Supplies" example above, the carrier computing entity 100 may provide a user interface element for confirming whether the cooking supplies include either a steak knife or a propane tank. FIGS. 9A and 9B depict one example user interface element for confirming whether the cooking supplies include either a steak knife or a propane tank, according to one embodiment. Interaction with the user interface element can confirm that the package does not contain these goods/items. Similarly, interaction with the user interface element can confirm that the package includes these goods/items. For example, FIGS. 9A and 9B depict user interface element 902 for indicating whether the package includes these goods/items. In other implementations, radio buttons (not shown) may be used to confirm that package contains the goods/items or to confirm that the package does not include the goods/items. For example, the radio button may be a simple "YES" and "NO" buttons.

The process 800 may, responsive to receiving information/data confirming that package includes goods/items corresponding to the one or more keywords for the particular node, continue with blocking shipping of the package (808). The process 800 may then continue with providing the a message in the user interface specifying that shipping was blocked because the package contains goods/items not allowed for shipping and identifying one or more keywords associated with the particular node (810). For example, the carrier computing entity may provide a message, notification, alert, and/or similar words used herein specifying that the package includes a steak knife and therefore it is not allowed for shipping. Alternatively, responsive to receiving information/data confirming that package does not include any goods/items corresponding to the one or more keywords for the particular node, completing shipping of the package. The steps of process 700 may performed by an appropriate computing entity (e.g., a user computing entity, a carrier computing entity, and/or a combination of both entities).

In some implementations, receiving alterations of information/data at user interface element 400, during the processes 700 and/or 800, restarts the processes 700 and/or 800. For example, in response to receiving input altering the description of goods/items at user interface element 400, the processes 700 and/or 800 may compare text keywords from the altered description of goods/items to the keyword index associating keywords with actions. In some implementations, every time the description of goods/items text is altered, a new comparison between the altered text and the keyword index may be performed.

In some implementations, completion of information/data entry using user interface element 400 is based on a timer. For example, users may be allocated a threshold amount of time to complete the information/data entry process. If the threshold amount of time expires, the shipping initiation process may be terminated. For example, users may be allocated a 2, 3, 5, or 10 minute window to complete the information/data entry process. In response to expiration of the configurable time window, the shipping initiation process may be terminated by an appropriate computing entity (e.g., carrier computing entity 100, user computing entity 110, and/or the like). In some implementations, the user interface element 400 is cleared from any input text in response to the expiration of the configurable time window.

In some implementations, other actions associated with keywords in the hierarchy may also be automatically facilitated by the user interface. In some implementations, a price is associated with nodes from the hierarchy. For example, a price or a price category may be determined for shipping based on the description of goods/items text keyword matching keywords for nodes from the hierarchy. For example, in response to determining that the goods/items to be shipped include goods/items that are associated with being fragile, a specific tier of shipping prices may be applied to the package. Similarly, insurance may be automatically applied to a package based on the description of goods/items text keywords matching keywords for nodes from the hierarchy specifying insurance requirements association with keywords. In some implementations, the insurance may be optionally offered via a user interface element. In other implementations, the insurance is automatically applied. In some implementations, the user interface described above is integrated with other shipping systems. For example, the user interface may be integrated with shipping security devices (e.g., metal detectors, Geiger counters, X-Ray machines, and/or the like). In some implementations, goods/items are identified and deemed hazardous in a package based on a combination of keyword matching and security devices.

The following sections describes exemplary actions based on the level and type of the nodes. The sections are arranged based on the type of node.

A. Exemplary Actions for End Nodes

Figure 10A:
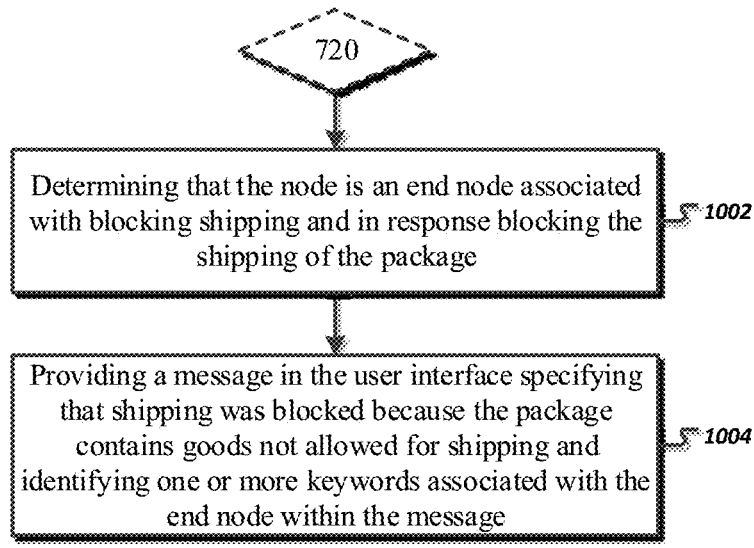
Figure 10B:
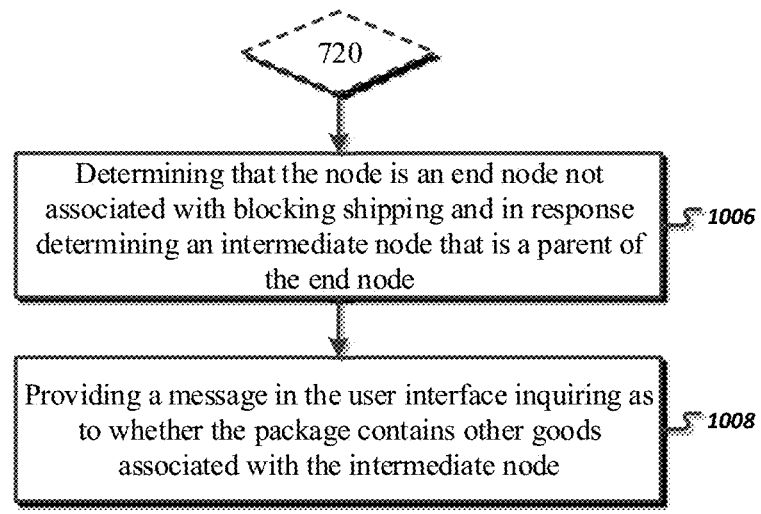
Figure 10C:
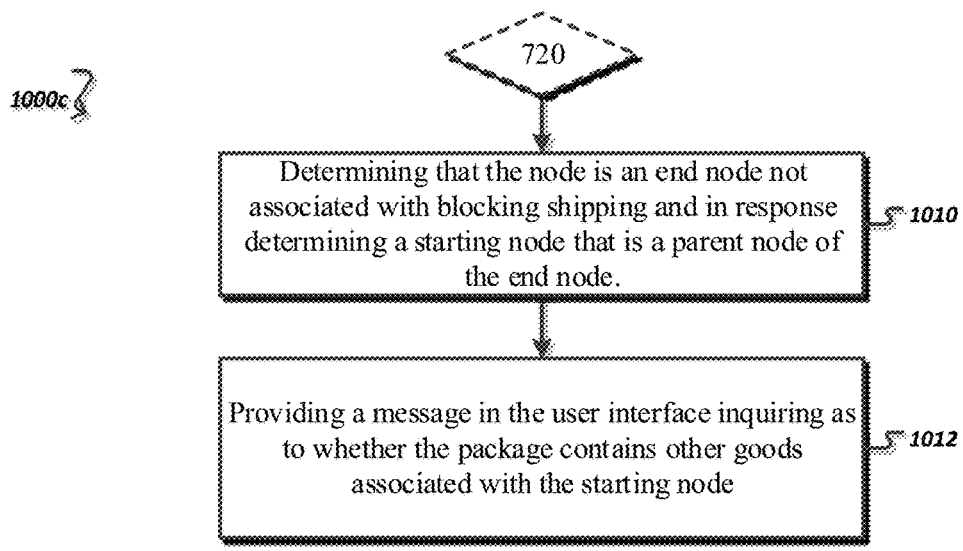
Figure 10D:
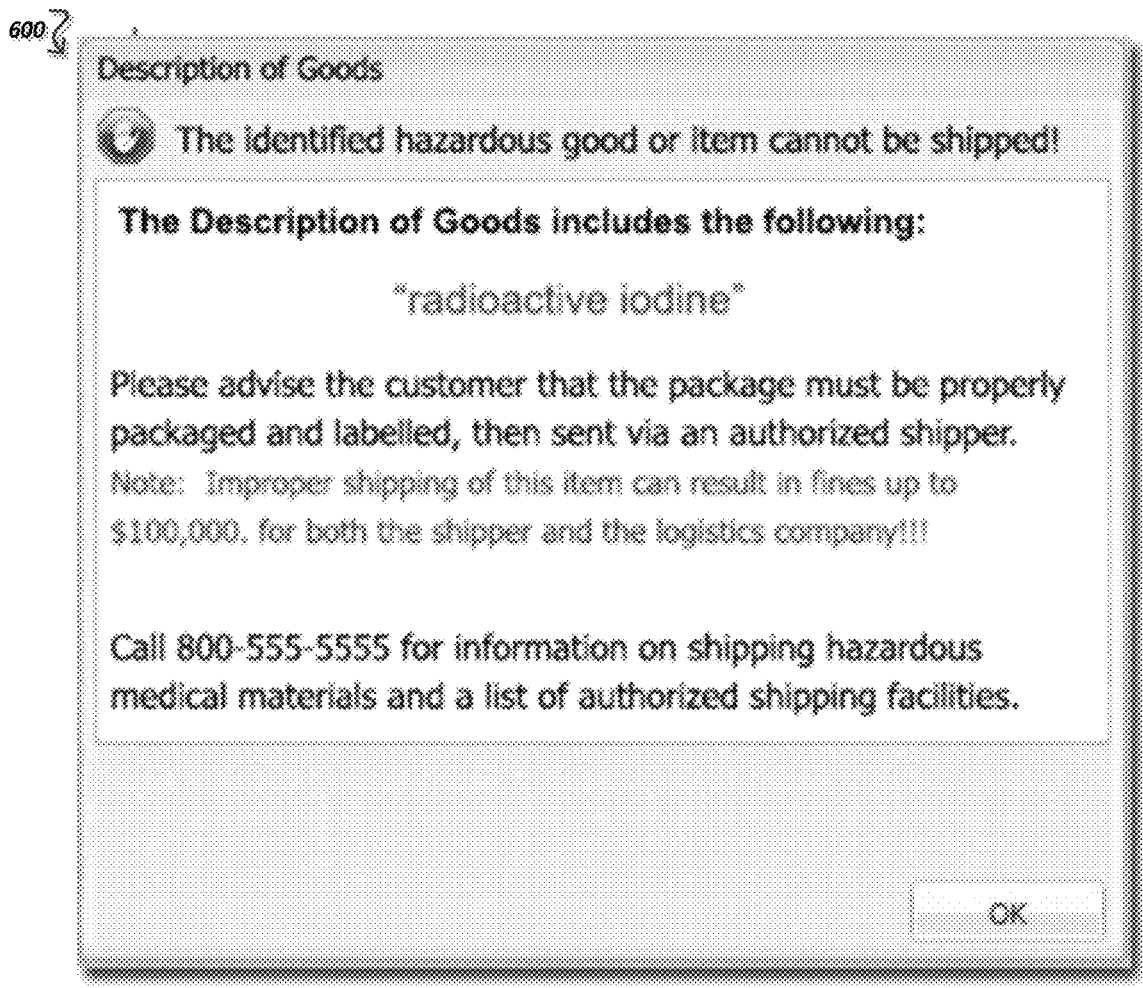
Figure 11A:
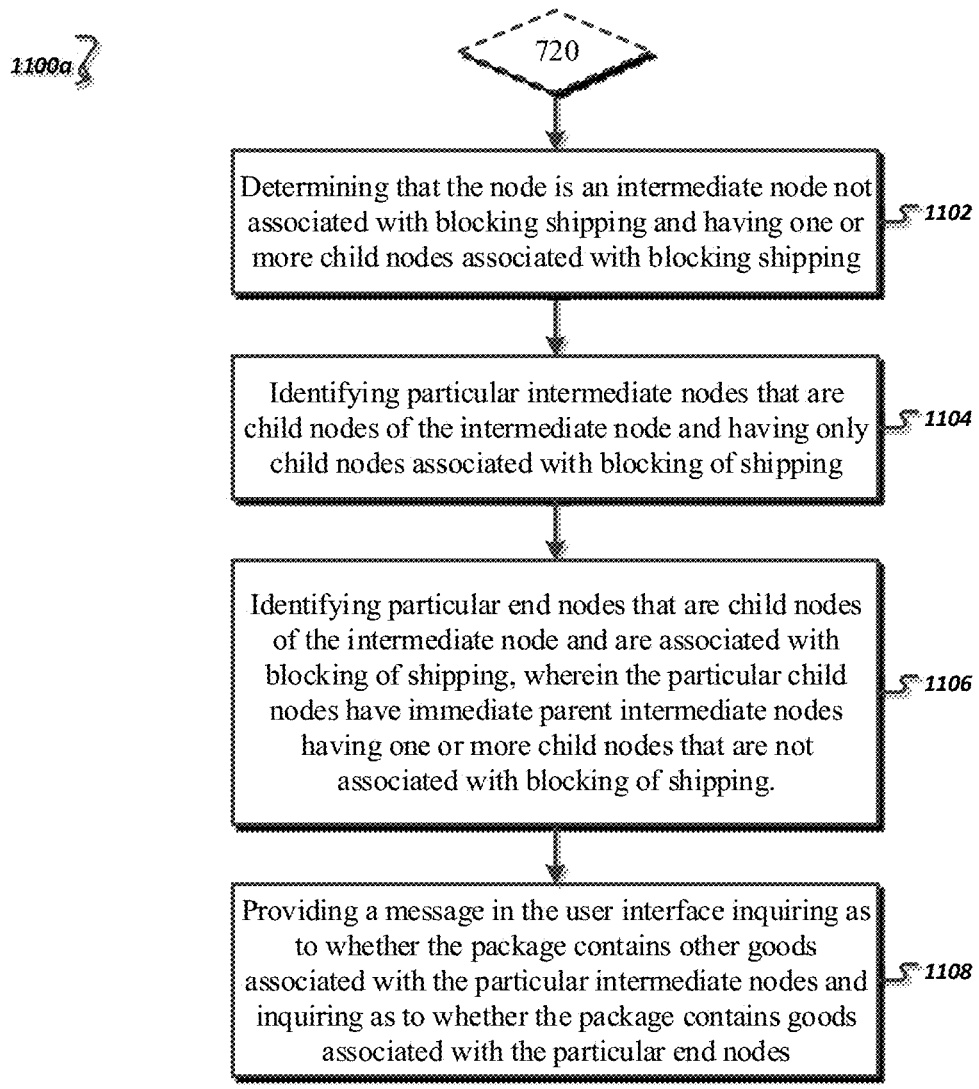
Figure 11B:
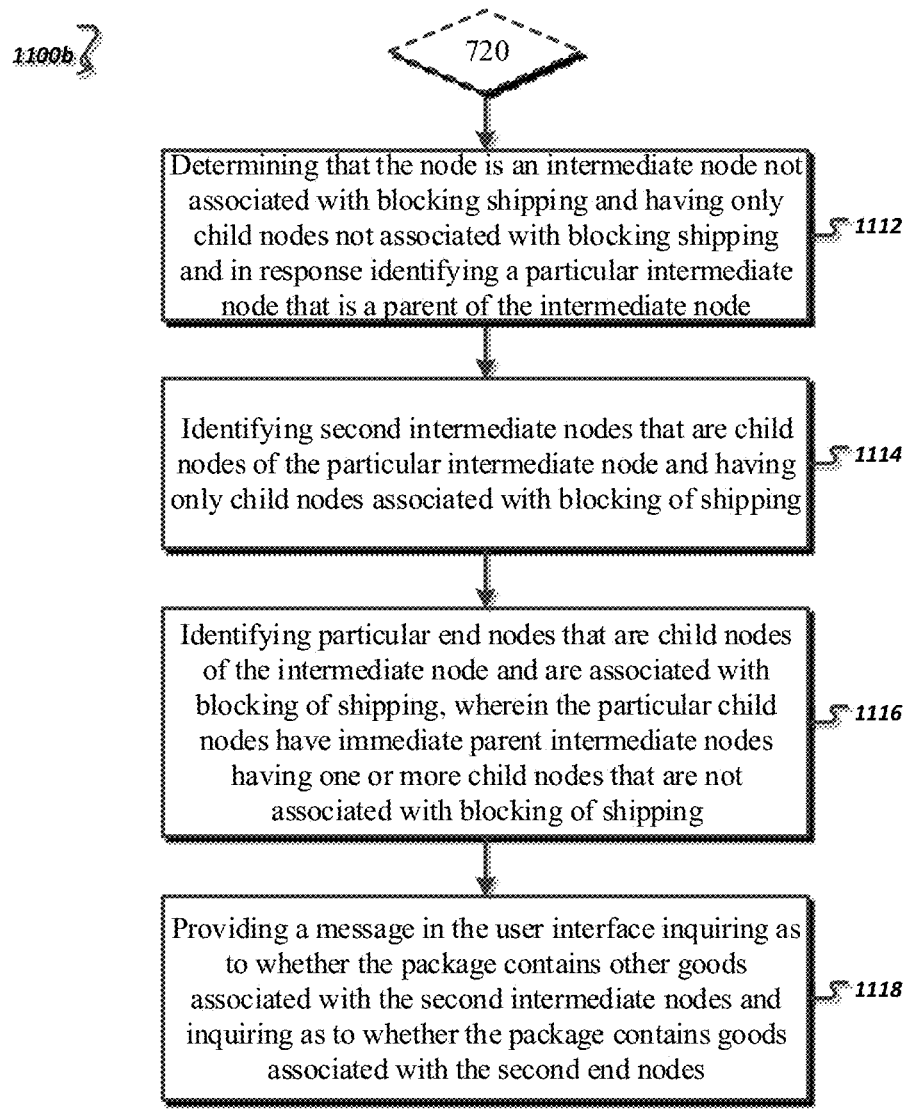
Figure 11C:
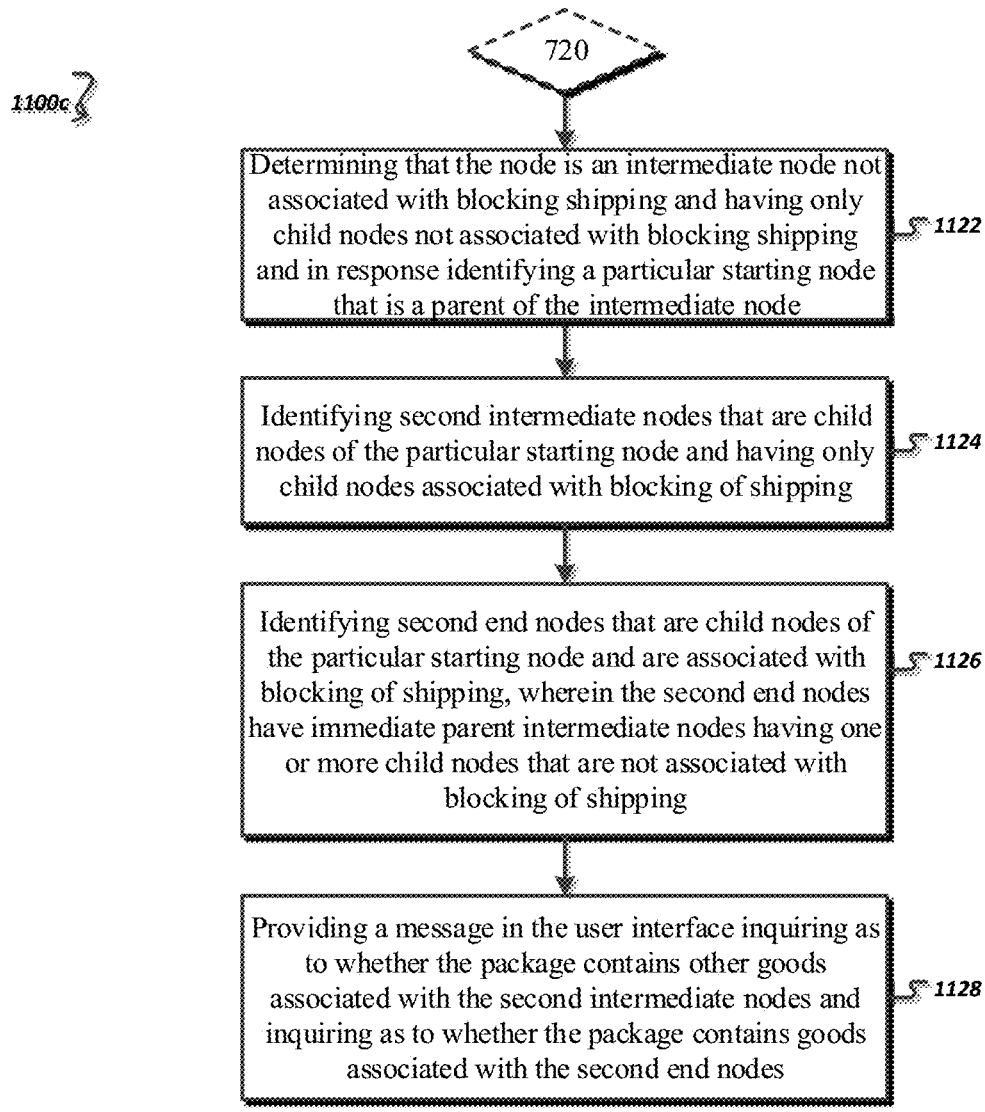
Figure 11D:
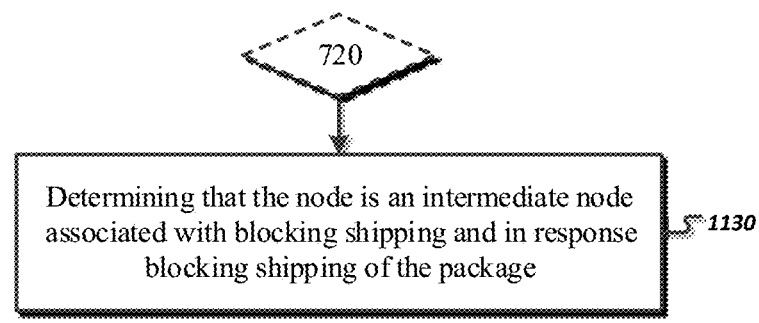
Figure 12A:
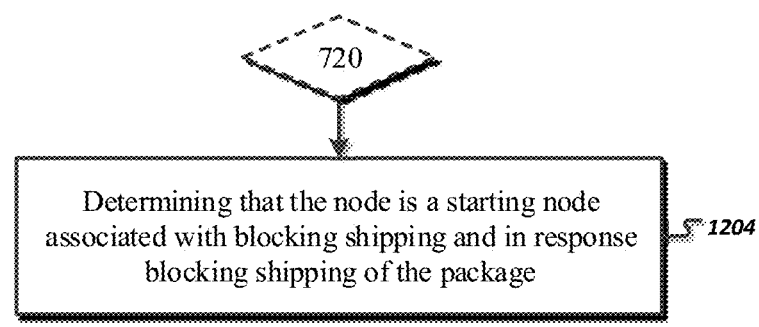
Figure 12B:
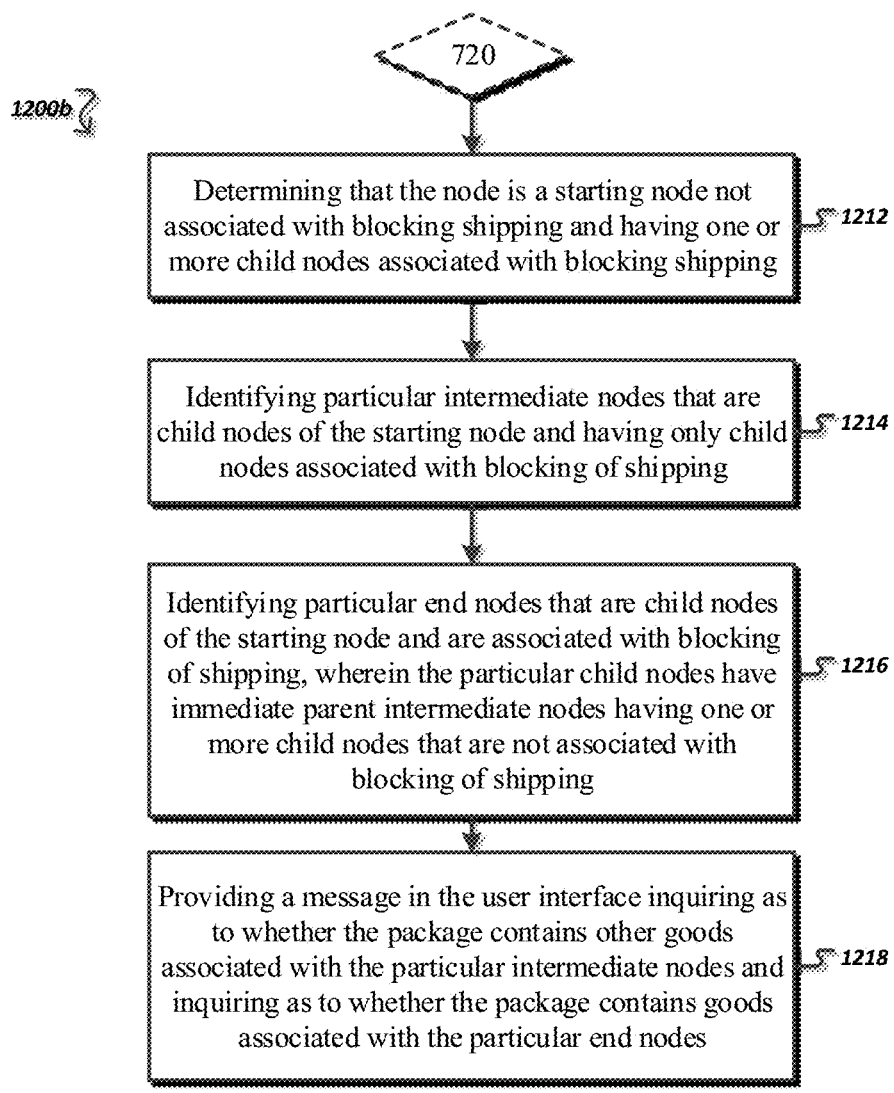

In some implementations, the process 700 may optionally continue with the optional steps of processes 1000a, 1000b, and 1000c. In one implementation, the process 700 continues with optional steps of process 1000a. The process 1000a begins with determining that the node is an end node associated with blocking shipping and in response blocking the shipping of the package (1002). For example, with reference to FIG. 6, the node "Radioactive Iodine" may be an end node having matching one or more keywords with the text shipping description. The node "Radioactive Iodine" shown in grey is a node associated with blocking of shipping. Accordingly, the process 1000a may continue with providing a message in the user interface specifying that shipping was blocked because the package contains goods/items not allowed for shipping and identifying one or more keywords associated with the end node within the message (1004). In some implementations, the process 1000a may block shipping of the package containing radioactive iodine. In one implementation, the carrier computing entity 100 may provide a message indicating that shipping was blocked because the package contains radioactive iodine, as shown in FIG. 10C.

In some implementations, the process 700 may optionally continue with the optional steps of process 1000b. The process 1000b begins with determining that the node is an end node not associated with blocking shipping and in response determining an intermediate node that is a parent of the end node (1006). For example, with reference to FIG. 6, the node "Butter Knife" may be an end node having matching one or more keywords with the text shipping description. The "Butter Knife" node is an end node not associated with blocking of shipping. In one implementation, the process 1000b may determine an intermediate node that is a parent of the end node "Butter Knife." In one implementation, the carrier computing entity 100 may identify the "Knife" node as an intermediate node that is a parent of the "Butter Knife" node. In a different implementation, the carrier computing entity 100 may identify the "silverware" node as an intermediate node that is a parent of the "Butter Knife" node. Yet in a different implementation, the carrier computing entity 100 may identify the "Cooking Supplies" node as an intermediate node that is a parent of the "Butter Knife" node. In some implementations, the carrier computing entity 100 may determine and/or identify an intermediate parent node based on a configurable threshold. For example, the configurable threshold may specify that the intermediate parent node is an immediate and/or direct intermediate parent node. In some implementations, the configurable threshold may specify that intermediate parent node is separated from the end node by a configurable number of nodes (e.g., 1, 2, 3). For example, the "Silverware" node is a parent node of the "Butter Knife" node that is separate from the "Butter Knife" node by 1 node.

The process 1000b may continue with providing a message in the user interface inquiring as to whether the package contains other goods/items associated with the intermediate node (1008). For example, the carrier computing entity may provide a message stating "does your package contain any other silverware?" Similarly, the message may state "does your package contain any other knifes?" or "does your package contain any other cooking supplies?" In one implementation, the carrier computing entity 100 may determine child end nodes of the intermediate node that are associated with blocking of shipping. For example, with reference to the examples above wherein the intermediate node is either the "Knife" node or the "Silverware" node, the carrier computing entity 100 may determine that node "Steak Knife" is a child node, of intermediate node, that is associated with blocking of shipping. The carrier computing entity 100 may then provide a message inquiring as to whether the package contains goods/items associated with keywords of the end node associated with blocking of shipping. For example, the carrier computing entity 100 may provide a message for display on a consumer or agent computing entity 100 stating "does your package contain a Steak Knife?" Similarly, with reference to the example above wherein the intermediate parent node is the "Cooking Supplies" node, the carrier computing entity may provide a message stating "does your package contain either a Steak Knife or a Propane Tank?" Note that the end node propane tank is an end node associated with block shipping that is a child node of the "Cooking Supplies" node.

In some implementations, the process 700 may continue with the optional steps of process 1000C. The process 1000C begins with determining that the node is an end node not associated with blocking shipping and in response determining a starting node that is a parent node of the end node (1010). For example, with reference to FIG. 6, the node "Butter Knife" may be an end node having matching one or more keywords with the text shipping description. The "Butter Knife" node is an end node not associated with blocking of shipping. In one implementation, the process 1000c may determine a starting node that is a parent of the end node "Butter Knife." For example, carrier computing entity 100 may determine the starting node "Camping Equipment and Supplies" as parent starting node for the end node "Butter Knife." The process 1000b may continue with providing a message in the user interface inquiring as to whether the package contains other goods/items associated with the starting node (1012). For example, the message may state "does your package include any other Camping Equipment and Supplies?" Alternatively, the message may state "please identify any other Camping Equipment and Supplies in the package." In one implementation, the carrier computing entity 100 may determine child end nodes of the starting node that are associated with blocking of shipping. For example, the carrier computing entity 100 may identify the nodes "Gun Powder," "Ammunition," Steak Knife," and "Propane Tank" as end child nodes of starting node "Camping Equipment and Supplies" that are each associated with blocking of shipping. The carrier computing entity may then provide a message inquiring as to whether the package includes any of the goods/items associated with keywords of each of these nodes. For example, the message may state "does your package include any of the following items? Gun Powder, Ammunition, Steak Knife, and Propane Tank." User interactions with the messages indicating that the package does not include any of the items, may result in completion of shipping. However, in some implementations, interactions indicating that the package includes one or more goods/items from the goods/items above may result in blocking of shipping.

B. Exemplary Actions for Intermediate Nodes

In some implementations, the process 700 may optionally continue with the optional steps of processes 1100a, 1100b, and 1100c. In one implementation, the process 700 continues with optional steps of process 1100a. The process 1000a begins with determining that the node is an intermediate node not associated with blocking shipping and having one or more child nodes associated with blocking shipping (1102). For example, with reference to FIG. 6, the node "Hunting Equipment and Supplies" is an intermediate node that is not associated with blocking of shipping and having one or more child nodes associated with blocking of shipping. The process 1100a may continue with identifying particular intermediate nodes that are child nodes of the intermediate node and having only child nodes associated with blocking of shipping (1104). For example, the carrier computing entity 100 may identify the intermediate node "Guns" as the particular intermediate node, that is a child node of the intermediate node "Hunting Equipment and Supplies" and having only child nodes associated with blocking of shipping.

The process 1100a may continue with identifying particular end nodes that are child nodes of the intermediate node and are associated with blocking of shipping, wherein the particular child nodes have immediate parent intermediate nodes having one or more child nodes that are not associated with blocking of shipping (1106). For example, the carrier computing entity 100 may identify the "Bowie Knife" node and the "Pocket Knife" node as child end nodes of the "Hunting Equipment and Supplies" node that are associated with blocking of shipping. The "Hunting Blades" node is the immediate parent of the "Bowie Knife" node and the "Pocket Knife" node. Note that the "Hunting Blades" node has an end child node that is not associated with blocking of shipping. For example, the "Sheath" node is a child node of the "Hunting blade" node that is not associated with blocking of shipping.

Finally, the process 1100a may end with providing a message in the user interface inquiring as to whether the package contains other goods/items associated with the particular intermediate nodes and inquiring as to whether the package contains goods/items associated with the particular end nodes (1108). For example, carrier computing entity 100 may provide a message for display at agent or user computer entity 110 stating "does your package include any of the following items? Guns, Bowie Knives, or Pocket Knives." In some implementations, keywords for the end nodes of the particular intermediate node may be uses in addition to the keywords for the particular intermediate node. For example, carrier computing entity 100 may provide a message for display at agent or user computing entity 110 stating "does your package include any of the following items? Guns, Gun Powder, Ammunition, Bowie Knives, or Pocket Knives."

In one implementation, the process 700 continues with optional steps of process 1100b. The process 1100b begins with determining that the node is an intermediate node not associated with blocking shipping and having only child nodes not associated with blocking shipping and in response identifying a particular intermediate node that is a parent of the intermediate node (1112). For example, the carrier computing entity 100 may determine that the node is the "Clothing" node of FIG. 6. The "Clothing" node is an intermediate node that is not associated with blocking of shipping and having only child nodes not associated with blocking of shipping. For example, the child nodes "Hunting Vests," "Helmet," and "Hunting Boots" are all not associated with blocking of shipping. The carrier computing entity 100 may then identify the "Hunting Equipment and Supplies" node as an intermediate parent node of the "Clothing" node.

The process 1100b may then continue with identifying second intermediate nodes that are child nodes of the particular intermediate node and having only child nodes associated with blocking of shipping (1114). For example, the carrier computing entity 100 may identify the node "Guns" as a child node of the node "Hunting Equipment and Supplies" having only child nodes associated with blocking of shipping. In turn, the process 1100b may continue with identifying particular end nodes that are child nodes of the intermediate node and are associated with blocking of shipping, wherein the particular child nodes have immediate parent intermediate nodes having one or more child nodes that are not associated with blocking of shipping (1116). For example, the carrier computing entity 100 may identify the "Bowie Knife" node and the "Pocket Knife" node as the particular child nodes associated with blocking of shipping and having an immediate parent intermediate node ("Hunting Blades") having one or more child nodes that are not associated with blocking of shipping ("Sheath").

Finally, the process 1100b may end with providing a message in the user interface inquiring as to whether the package contains other goods/items associated with the second intermediate nodes and inquiring as to whether the package contains goods/items associated with the second end nodes (1118). For example, carrier computing entity 100 may provide a message for display at agent or user computing entity 110 stating "does your package include any of the following items? Guns, Bowie Knives, or Pocket Knives." In some implementations, keywords for the end nodes of the particular intermediate node may be uses in addition to the keywords for the particular intermediate node. For example, carrier computing entity 100 may provide a message for display at agent or user computing entity 110 stating "does your package include any of the following items? Guns, Gun Powder, Ammunition, Bowie Knives, or Pocket Knives."

In one implementation, the process 700 continues with optional steps of process 1100c. The process 1100c begins with determining that the node is an intermediate node not associated with blocking shipping and having only child nodes not associated with blocking shipping and in response identifying a particular starting node that is a parent of the intermediate node (1122). For example, the carrier computing entity 100 may determine that the node is the "Clothing" node of FIG. 6. The "Clothing" node is an intermediate node that is not associated with blocking of shipping and having only child nodes not associated with blocking of shipping. For example, the child nodes "Hunting Vests," "Helmet," and "Hunting Boots" are all not associated with blocking of shipping. The carrier computing entity 100 may then identify the "Camping Equipment and Supplies" node as the particular starting parent node of the "Clothing" node.

The process 1100c may then continue with identifying second intermediate nodes that are child nodes of the particular starting node and having only child nodes associated with blocking of shipping (1124). For example, the carrier computing entity 100 may identify the node "Guns" as a child node of the starting node "Camping Equipment and Supplies" that has only child nodes associated with blocking of shipping. In turn, the process 1100c may continue with identifying second end nodes that are child nodes of the particular starting node and are associated with blocking of shipping, wherein the second end nodes have immediate parent intermediate nodes having one or more child nodes that are not associated with blocking of shipping (1116). For example, the carrier computing entity may identify the end nodes "Propane Tank," "Steak Knife," "Bowie Knife," and "Pocket Knife" as the second end nodes.

Finally, the process 1100c may end with providing a message in the user interface inquiring as to whether the package contains other goods/items associated with the second intermediate nodes and inquiring as to whether the package contains goods/items associated with the second end nodes (1118). For example, carrier computing entity 100 may provide a message for display at agent or user computing entity 110 stating "does your package include any of the following items? Guns, Propane Tanks, Steak Knives, Bowie Knives, or Pocket Knives." In some implementations, keywords for the end nodes of the particular intermediate node may be uses in addition to the keywords for the second intermediate node. For example, carrier computing entity 100 may provide a message for display at agent or user computing entity 110 stating "does your package include any of the following items? Guns, Gun Powder, Ammunition, Propane Tanks, Steak Knives, Bowie Knives, or Pocket Knives." Alternatively, in some implementations, the message may be instructions to remove the identified goods/items from the package. For example, the message may state "please remove all of the following goods/items from the package: Guns, Gun Powder, Ammunition, Propane Tanks, Steak Knives, Bowie Knives, or Pocket Knives."

In one implementation, the process 700 continues with the optional steps of process 1100d. The process 1100d begins with determining that the node is an intermediate node associated with blocking shipping and in response blocking shipping of the package (1130). For example, the "Guns" node is an intermediate node associated with blocking of shipping. The carrier computing entity 100 may determine that the "Guns" node is an intermediate node (having one or more keywords matching the textual description 402) that is associated with blocking of shipping. In turn, the shipping of the package containing goods/items associated with the "Guns" node may be blocked. In some implementations, the process 1100d continues with providing a message to user computing entity 110 indicating that shipping was blocked because the package contains goods/items not allowed for shipping. In some implementations, the message may identify the goods/items that resulted in termination or blocking of shipping. For example, the message may state "the description of goods includes Guns which are not allowed for shipping." Alternatively, the message may state "the description of goods includes one or more of the following goods/items that are not allowed for shipping: Guns, Gunpowder, Ammunition."

C. Exemplary Actions for Starting Nodes

In some implementations, the process 700 may optionally continue with the optional steps of processes 1200a, and 1200b. In one implementation, the process 700 continues with the optional steps of process 1200a. The process 1200a begins with determining that the node is a starting node associated with blocking shipping and in response blocking shipping of the package (1204). For example, the carrier computing entity 100 may determine that starting node "Radioactive Materials" has one or more keywords matching or partially matching keywords from the textual description 402. The node "Radioactive Materials" is a starting node associated with blocking of shipping. Accordingly, the carrier computing entity 110 may then block the shipping of the package. In some implementations, a starting node associated with blocking of shipping may be a starting node having only child nodes associated with blocking of shipping. In some implementations, the process 1200a continues with providing a message to user computer entity 110 indicating that shipping was blocked because the package contains goods/items not allowed for shipping. In some implementations, the message may identify the goods/items that resulted in termination or blocking of shipping. For example, the message may state "the description of goods includes Radioactive Materials which are not allowed for shipping." Alternatively, the message may state "the description of goods includes one or more of the following goods/items that are not allowed for shipping: Radioactive Materials, Radioactive Iodine, Radioactive Uranium."

In one implementation, the process 700 continues with the optional steps of process 1200b. The process 1200b begins with determining that the node is a starting node not associated with blocking shipping and having one or more child nodes associated with blocking shipping (1212). For example, the carrier computing entity may identify the "Camping Equipment and Supplies" node as a starting node not associated with blocking of shipping having one or more child nodes associated with blocking of shipping. In some implementations, the stating node may be identified based on keywords of the node matching one or more keywords from the textual description 402. The process 1200*b* may continue with identifying particular intermediate nodes that are child nodes of the starting node and having only child nodes associated with blocking of shipping 1214. For example, carrier computing entity 100 may identify the "Guns" node as the particular intermediate child node of the "Camping Equipment and Supplies" starting node, having only child nodes that are associated with blocking of shipping. As shown in FIG. 6, the "Gun Powder" and "Ammunition" nodes are both child nodes of the "Guns" node that are each associated with blocking of shipping.

The process 1200*b* may continue with identifying particular end nodes that are child nodes of the starting node and are associated with blocking of shipping, wherein the particular child nodes have immediate parent intermediate nodes having one or more child nodes that are not associated with blocking of shipping (1216). For example, the carrier computing entity may identify the end nodes "Propane Tank," "Steak Knife," "Bowie Knife," and "Pocket Knife" as the particular end nodes. Note that each of these nodes have immediate parents that have at least one immediate child node that is not associated with blocking of shipping. Finally, the process 1200*b* may end with providing a message in the user interface inquiring as to whether the package contains other goods/items associated with the particular intermediate nodes and inquiring as to whether the package contains goods/items associated with the particular end nodes (1218). For example, carrier computing entity 100 may provide a message for display at agent or user computing entity 110 stating "does your package include any of the following items? Guns, Propane Tanks, Steak Knives, Bowie Knives, or Pocket Knives." In some implementations, keywords for the end nodes of the particular intermediate node may be used in addition to the keywords for the particular intermediate node. For example, carrier computing entity 100 may provide a message for display at agent or user computing entity 110 stating "does your package include any of the following items? Guns, Gun Powder, Ammunition, Propane Tanks, Steak Knives, Bowie Knives, or Pocket Knives." Alternatively, in some implementations, the message may be instructions to remove the identified goods/items from the package. For example, the message may state "please remove all of the following goods/items from the package: Guns, Gun Powder, Ammunition, Propane Tanks, Steak Knives, Bowie Knives, or Pocket Knives."

3. Additional Implementation Details

Although an example processing or computing entity/system has been described with reference to FIGS. 1-3, implementations of the subject matter and the functional operations described herein can be implemented in other types of digital electronic circuitry, or in computer software, firmware, or hardware, including the structures disclosed herein and their structural equivalents, or in combinations of one or more of them.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

IV. Conclusion

Many modifications and other embodiments of the inventions set forth herein will come to mind to one skilled in the art to which these inventions pertain, having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation

The invention claimed is:

1. A computer implemented method causing display of an interactive user interface comprising an interactive user interface element for confirming whether a package includes an item corresponding to a keyword and identifying actions to be performed with respect to the package, the computer implemented method comprising:

receiving, via a user interface displayed on a display of a user computing device, an input from a user, the input comprising shipping data descriptive of the item to be shipped in the package, the shipping data including a configurable number of characters and/or letters;

automatically accessing regulation data, via at least one processor of the user computing device, the regulation data comprising a multi-level hierarchy of nodes arranged in a tree structure, wherein (a) each node specifies one or more keywords and wherein (b) the tree structure comprises (i) one or more starting nodes having one or more child nodes and having no parent nodes, (ii) one or more intermediate nodes having at least one of a child node and a parent node, and (iii) one or more end nodes having at least one parent node and no child nodes;

determining, via the at least one processor, that at least a portion of the configurable number of characters and/or letters matches a keyword associated with a node in the multi-level hierarchy of nodes by determining whether the node has two or more child nodes;

determining, via the at least one processor, a type of the node, wherein the type of the node specifies whether the node is one of a starting node, an intermediate node, or an end node in the multi-level hierarchy of nodes, wherein the end node comprises at least one parent node and no child nodes;

determining that the node is not an end node and identifying a family member of the node;

providing, via the at least one processor, a message for display in the interactive user interface element displayed on the display of the user computing device inquiring as to whether the package contains one or more items associated with one or more keywords associated with the family member of the node;

providing, to the computing device, information that causes real-time display of the interactive user interface element on the display of the computing device; and receiving confirmation from the user, via the interactive user interface element displayed on the display of the user computing device, of whether the item corresponds to the keyword associated with the node and/or the one or more keywords associated with the family member of the node.

2. The method of claim 1, further comprising responsive to determining, via the at least one processor, that the family member of the node comprises at least one keyword associated with blocking of shipping, determining that the family member of the node is an end node.

3. The method of claim 1, further comprising:
determining, via the at least one processor, that the family member of the node is an end node associated with blocking of shipping and in response, blocking the shipping of the package storing the item; and
providing, via the at least one processor, another message in the interactive user interface element displayed on the display of the user computing device, specifying that shipping was blocked because the package contains items not allowed for shipping and identifying the keyword associated with the family member of the node within the message.

4. The method of claim 1, further comprising:
determining, via the at least one processor, that the family member of the node is an end node not associated with blocking of shipping and in response determining an intermediate node that is a parent node of the family member of the node, wherein the message includes an inquiry as to whether the package contains other items associated with one or more keywords associated with the intermediate node.

5. The method of claim 1, further comprising:
determining, via the at least one processor, that the family member of the node is an end node not associated with blocking of shipping and in response determining a starting node that is a parent node of the family member of the node, wherein the message includes an inquiry as to whether the package contains other items associated with one or more keywords associated with the starting node.

6. The method of claim 1, further comprising:
determining, via the at least one processor, that the family member of the node is an intermediate node not associated with blocking of shipping and having one or more child nodes associated with the blocking of shipping;

identifying, via the at least one processor, particular intermediate nodes that are child nodes of the family member of the node, and wherein the particular intermediate nodes comprise only child nodes associated with the blocking of shipping;

identifying, via the at least one processor, particular end nodes that are child nodes of the family member of the node and are associated with the blocking of shipping, wherein the particular end nodes have immediate parent intermediate nodes having one or more child nodes that are not associated with the blocking of shipping; and providing, via the at least one processor, another message in the interactive user interface element displayed on the display of the user computing device, inquiring as to whether the package contains other items associated with the particular intermediate nodes and inquiring as to whether the package contains items associated with one or more keywords associated with the particular end nodes.

7. The method of claim 1, further comprising:
determining, via the at least one processor, that the family member of the node is an intermediate node not associated with blocking of shipping and having only child nodes not associated with the blocking of shipping and in response, identifying a particular intermediate node that is a parent of the family member of the node;

identifying, via the at least one processor, second intermediate nodes that are child nodes of the particular intermediate node and having only child nodes associated with the blocking of shipping;

identifying, via the at least one processor, second end nodes that are child nodes of the particular intermediate node and are associated with the blocking of shipping, wherein the second end nodes have immediate parent intermediate nodes having one or more child nodes that are not associated with the blocking of shipping;

wherein the message includes an inquiry as to whether the package contains other items associated with the second intermediate nodes and inquiring as to whether the package contains items associated with one or more keywords associated with the second end nodes.

8. The method of claim 1, further comprising:
determining, via the at least one processor, that the family member of the node is an intermediate node not associated with blocking of shipping and having only child nodes not associated with the blocking of shipping and in response identifying a particular starting node that is a parent of the family member of the node;

identifying, via the at least one processor, second intermediate nodes that are child nodes of the particular starting node and having only child nodes associated with the blocking of shipping;

identifying, via the at least one processor, second end nodes that are child nodes of the particular starting node and are associated with the blocking of shipping, wherein the second end nodes have immediate parent intermediate nodes having one or more child nodes that are not associated with the blocking of shipping;

wherein the message includes an inquiry as to whether the package contains other items associated with the second intermediate nodes and inquiring as to whether the package contains items associated with one or more keywords associated with the second end nodes.

9. The method of claim 1, further comprising determining, via the at least one processor, that the family member of the node is an intermediate node associated with blocking of shipping, and in response, blocking shipping of the package.

10. The method of claim 1, further comprising:
   determining, via the at least one processor, that the family member of the node is a starting node not associated with blocking of shipping and having one or more child nodes associated with the blocking of shipping;
   identifying, via the at least one processor, particular intermediate nodes that are child nodes of the family member of the node, and wherein the particular intermediate nodes comprise only child nodes associated with the blocking of shipping;
   identifying, via the at least one processor, particular end nodes that are child nodes of the node and are associated with the blocking of shipping, wherein the particular end nodes have immediate parent intermediate nodes having one or more child nodes that are not associated with the blocking of shipping,
   wherein the message includes an inquiry as to whether the package contains other items associated with the particular intermediate nodes and inquiring as to whether the package contains items associated with one or more keywords associated with the particular end nodes.

11. The method of claim 1, further comprising determining that the family member of the node is a starting node associated with blocking of shipping, and in response, blocking shipping of the package.

12. A system for displaying an interactive user interface that displays an interactive user interface element for receiving at least one keyword from a user and for receiving confirmation of whether a package includes an item corresponding to the at least one keyword and identifying actions to be performed with respect to the package, the system comprising:
   a data processing apparatus; and
   a computer memory apparatus in communication with the data processing apparatus and storing instructions executable by the data processing apparatus, that when executed cause the data processing apparatus to perform operations comprising:
   receiving one or more keywords descriptive of the item to be shipped in the package;
   accessing regulation data, the regulation data comprising a multi-level hierarchy of nodes arranged in a tree structure, wherein-the tree structure comprises (i) one or more starting nodes having one or more child nodes and having no parent nodes, (ii) one or more intermediate nodes having at least one of a child node and a parent node, and (iii) one or more end nodes having at least one parent node and no child nodes;
   determining that a particular keyword from the received one or more keywords matches a keyword of a particular node in the multi-level hierarchy of nodes;
   determining a type of the particular node by determining whether the particular node has two or more child nodes, wherein the type of the particular node specifies whether the particular node is one of a starting node, an intermediate node, or an end node in the multi-level hierarchy of nodes, wherein the end node comprises at least one parent node and no child nodes;
   wherein when the particular node is not an end node:
   identifying a family member of the particular node and providing, via the at least one processor, a message for display in the interactive user interface element displayed on a display of a computing device inquiring as to whether the package contains one or more items associated with one or more keywords of the family member of the particular node;
   displaying in real time, the interactive user interface element on the display of the computing device; and
   receiving confirmation from the user, via the interactive user interface element, of whether the item corresponds to the keyword of the particular node and/or the one or more keywords of the family member of the particular node.

13. The system of claim 12, wherein the operations further comprise determining that the keyword of the particular node is associated with blocking of shipping, and providing information that causes display of the interactive user interface element for confirming whether the package storing the item to be shipped includes items corresponding to the keyword of the particular node.

14. The system of claim 12, wherein the operations further comprise: determining that the particular node is an end node associated with blocking of shipping and in response, blocking the shipping of the package storing the item to be shipped; and
   providing another message in the interactive user interface element specifying that shipping was blocked because the package contains items not allowed for shipping and identifying the keyword within the other message.

15. The system of claim 12, wherein the operations further comprise:
   determining that the particular node is an end node not associated with blocking of shipping and in response determining an intermediate node that is a parent of the particular node,
   wherein the message includes an inquiry as to whether the package contains other items associated with one or more keywords associated with the intermediate node.

16. The method of claim 12, wherein the operations further comprise:
   determining that the particular node is an end node not associated with blocking of shipping and in response determining a starting node that is a parent node of the particular node,
   wherein the message includes an inquiry as to whether the package contains other items associated with one or more keywords associated with the starting node.

17. The system of claim 12, wherein the operations further comprise:
   determining that the particular node is an intermediate node not associated with blocking of shipping and having one or more child nodes associated with the blocking of shipping;
   identifying particular end nodes that are child nodes of the particular node that are associated with the blocking of shipping,
   wherein the message includes an inquiry as to whether the package contains other items associated with the particular node and inquiring as to whether the package contains items associated with one or more keywords associated with the particular end nodes.

18. The system of claim 12, wherein the operations further comprise:
   determining that the particular node is an intermediate node not associated with blocking of shipping and having only child nodes not associated with the blocking of shipping, and in response, identifying a parent of the particular node;

identifying second intermediate nodes that are child nodes of the parent of the particular node having only child nodes associated with the blocking of shipping;

identifying end nodes that are child nodes of the parent of the particular node that are associated with the blocking of shipping, wherein the message includes an inquiry as to whether the package contains other items associated with the second intermediate nodes and inquiring as to whether the package contains items associated with one or more keywords associated with the end nodes.

19. The system of claim 12, wherein the operations further comprise:

determining that the particular node is an intermediate node not associated with blocking of shipping and having only child nodes not associated with the blocking of shipping, and in response, identifying a starting node that is a parent of the particular node;

identifying second intermediate nodes that are child nodes of the starting node having only child nodes associated with the blocking of shipping;

identifying end nodes that are child nodes of the starting node that are associated with the blocking of shipping, wherein the end nodes have immediate parent intermediate nodes having one or more child nodes that are not associated with the blocking of shipping, wherein the message includes an inquiry as to whether the package contains other items associated with the second intermediate nodes and inquiring as to whether the package contains items associated with one or more keywords associated with the end nodes.

20. The system of claim 12, wherein the operations further comprise determining that the particular node is an intermediate node associated with blocking of shipping, and in response, blocking of shipping of the package.

21. The system of claim 12, wherein the operations further comprise:

determining that the particular node is a starting node not associated with blocking of shipping and having one or more child nodes associated with the blocking of shipping;

identifying intermediate nodes that are child nodes of the particular node, having only child nodes associated with the blocking of shipping;

identifying end nodes that are child nodes of the particular node that are associated with the blocking of shipping, wherein the end nodes have immediate parent intermediate nodes having one or more child nodes that are not associated with the blocking of shipping, wherein the message includes an inquiry as to whether the package contains other items associated with the intermediate nodes and inquiring as to whether the package contains items associated with one or more keywords associated with the end nodes.

22. The system of claim 12, wherein the operations further comprise determining that the particular node is a starting node associated with blocking of shipping, and in response, blocking shipping of the package.

23. A computer program product comprising at least one non-transitory computer-readable storage medium having computer-readable program code portions stored therein, the at least one non-transitory computer-readable program code portions configured to perform a method for providing an interactive user interface configured to display an interactive user interface element for receiving one or more keywords from a user and for receiving confirmation of whether a package includes an item corresponding to the one or more keywords, and identifying an action to be performed with respect to the package, the method comprising:

receiving from a user, via the interactive user interface, one or more keywords descriptive of the item to be shipped in the package;

accessing regulation data, the regulation data comprising a multi-level hierarchy of nodes arranged in a tree structure, (a) each node in the multi-level hierarchy of nodes specifying one or more keywords, (b) the tree structure comprising (i) one or more starting nodes having one or more child nodes and having no parent nodes, (ii) one or more intermediate nodes having at least one of a child node and a parent node, and (iii) one or more end nodes having at least one parent node and no child nodes;

determining that a particular keyword from the received one or more keywords matches a keyword of a particular node in the multi-level hierarchy of nodes;

determining a type of the particular node by determining whether the particular node has two or more child nodes, wherein the type of the particular node specifies whether the particular node is one of a starting node, an intermediate node, or an end node in the multi-level hierarchy of nodes, wherein the end node comprises at least one parent node and no child nodes wherein when the particular node is not an end node:
identifying a family member of the particular node and providing, via the at least one processor, a message for display in the interactive user interface element displayed on a display of a computing device inquiring as to whether the package contains one or more items associated with one or more keywords associated with the family member of the particular node;

displaying, in real time, the interactive user interface element on the display of the computing device; and receiving confirmation from the user, via the interactive user interface element, of whether the item corresponds to the keyword of the particular node and/or the one or more keywords associated with the family member of the particular node.

24. The computer program product of claim 23, wherein the method further comprises the step of: determining that the keyword of the particular node is associated with blocking of shipping, and providing information that causes display of the interactive user interface element for confirming whether the package includes items corresponding to the keyword of the particular node.

25. The computer program product of claim 23, wherein the method further comprises the steps of:

determining that the particular node is an end node associated with blocking of shipping, and in response, blocking the shipping of the package storing the item; and providing another message in the interactive user interface element specifying that shipping was blocked because the package contains items not allowed for shipping, and identifying the keyword of the particular node within the other message.

26. The computer program product of claim 23, wherein the method further comprises the steps of:

determining that the particular node is an end node not associated with blocking of shipping, and in response, determining an intermediate node that is a parent of the particular node, wherein the message includes an inquiry as to whether the package contains other items associated with one or more keywords associated with the intermediate node.

27. The computer program product of claim 23, wherein the method further comprises: determining that the particular node is an end node not associated with blocking of shipping, and in response, determining a starting node that is a parent node of the particular node, wherein the message includes an inquiry as to whether the package contains other items associated with one or more keywords associated with the starting node.

28. The computer program product of claim 23, wherein the method further comprises:
   determining that the particular node is an intermediate node not associated with blocking of shipping and having one or more child nodes associated with the blocking of shipping;
   identifying child intermediate nodes that are child nodes of the particular node and having only child nodes associated with the blocking of shipping;
   identifying end nodes that are child nodes of the particular node that are associated with the blocking of shipping, wherein the end nodes have immediate parent intermediate nodes having one or more child nodes that are not associated with the blocking of shipping, wherein the message includes an inquiry as to whether the package contains other items associated with one or more keywords associated with the child intermediate nodes and inquiring as to whether the package contains items associated with the end nodes.

29. The computer program product of claim 23, wherein method further comprises:
   determining that the particular node is an intermediate node not associated with blocking of shipping and having only child nodes not associated with the blocking of shipping, and in response, identifying a parent of the particular node;
   identifying second intermediate nodes that are child nodes of the parent node that only have child nodes associated with the blocking of shipping; and
   identifying end nodes that are child nodes of the parent node that are associated with the blocking of shipping, wherein the end nodes have immediate parent intermediate nodes having one or more child nodes that are not associated with the blocking of shipping, wherein the message includes an inquiry as to whether the package contains other items associated with the second intermediate nodes and inquiring as to whether the package contains items associated with one or more keywords associated with the end nodes.

30. The computer program product of claim 23, wherein method further comprises:
   determining that the particular node is an intermediate node not associated with blocking of shipping and having only child nodes not associated with the blocking of shipping, and in response, identifying a starting node that is a parent of the particular node;
   identifying second intermediate nodes that are child nodes of the starting node that only have child nodes associated with the blocking of shipping;
   identifying end nodes that are child nodes of the starting node that are associated with the blocking of shipping, wherein the end nodes have immediate parent intermediate nodes having one or more child nodes that are not associated with the blocking of shipping, wherein the message includes an inquiry as to whether the package contains other items associated with the second intermediate nodes and inquiring as to whether the package contains items associated with one or more keywords associated with the end nodes.

31. The computer program product of claim 23, wherein method further comprises determining that the particular node is an intermediate node associated with blocking of shipping and in response blocking shipping of the package.

32. The computer program product of claim 23, wherein method further comprises:
   determining that the particular node is a starting node not associated with blocking of shipping and having one or more child nodes associated with the blocking of shipping;
   identifying intermediate nodes that are child nodes of the particular node having only child nodes associated with the blocking of shipping;
   identifying end nodes that are child nodes of the particular node and are associated with the blocking of shipping, wherein the end nodes have immediate parent intermediate nodes having one or more child nodes that are not associated with the blocking of shipping, wherein the message includes an inquiry as to whether the package contains other items associated with the intermediate nodes and inquiring as to whether the package contains items associated with one or more keywords associated the end nodes.

33. The computer program product of claim 23, wherein method further comprises determining that the particular node is a starting node associated with blocking of shipping, and in response, blocking shipping of the package.

* * * * *

UNITED STATES PATENT AND TRADEMARK OFFICE
CERTIFICATE OF CORRECTION

PATENT NO. : 10,719,802 B2
APPLICATION NO. : 14/931374
DATED : July 21, 2020
INVENTOR(S) : David Allison Bennett et al.

Page 1 of 1

It is certified that error appears in the above-identified patent and that said Letters Patent is hereby corrected as shown below:

In the Specification

In Column 1, Line 7, after "2015" insert -- , --.

In Column 1, Line 9, delete "entirety" and insert -- entireties --, therefor.

In Column 18, Line 53, delete "the a" and insert -- a --, therefor.

In Column 26, Line 40, after "limitation" insert -- . --, therefor.

In the Claims

In Column 29, Line 46, Claim 12, delete "wherein-the" and insert -- wherein the --, therefor.

In Column 30, Line 38, Claim 16, delete "method" and insert -- system --, therefor.

In Column 32, Line 25, Claim 23, after "nodes" insert -- ; --.

Signed and Sealed this
Eighth Day of September, 2020

Andrei Iancu
*Director of the United States Patent and Trademark Office*